(12) United States Patent
Gouda

(10) Patent No.: US 8,405,863 B2
(45) Date of Patent: Mar. 26, 2013

(54) IMAGE FORMING APPARATUS, IMAGE FORMING SYSTEM, AND METHOD OF PRIVATE PRINTING

(75) Inventor: Mai Gouda, Osaka (JP)

(73) Assignee: Kyocera Mita Corporation, Osaka (JP)

( * ) Notice: Subject to any disclaimer, the term of this patent is extended or adjusted under 35 U.S.C. 154(b) by 245 days.

(21) Appl. No.: 13/014,975

(22) Filed: Jan. 27, 2011

(65) Prior Publication Data
US 2011/0205578 A1  Aug. 25, 2011

(30) Foreign Application Priority Data
Feb. 19, 2010 (JP) .................................. 2010-034439

(51) Int. Cl.
*G06F 3/12* (2006.01)
(52) U.S. Cl. .................. 358/1.15; 358/1.13; 399/366
(58) Field of Classification Search .............. 358/1.15, 358/1.13; 399/366
See application file for complete search history.

(56) References Cited

U.S. PATENT DOCUMENTS

| | | | |
|---|---|---|---|
| 2005/0273620 A1 | 12/2005 | Kawabata et al. | |
| 2009/0185223 A1* | 7/2009 | Kanai et al. ................ | 358/1.15 |
| 2010/0123934 A1* | 5/2010 | Ohba .......................... | 358/1.15 |
| 2010/0141995 A1* | 6/2010 | Tomita et al. .............. | 358/1.15 |
| 2010/0149570 A1* | 6/2010 | Kamiya et al. ............. | 358/1.13 |

FOREIGN PATENT DOCUMENTS

| | | |
|---|---|---|
| JP | 2005-346366 A | 12/2005 |
| JP | 2006-270414 A | 10/2006 |

OTHER PUBLICATIONS

Patent Abstracts of Japan, English translation of JP 2006-270414.

* cited by examiner

*Primary Examiner* — Qian Yang

(57) ABSTRACT

There is provided an image forming apparatus includes: a list transmitting unit configured to transmit a handling user list to the first terminal device; an inquiring unit configured to make an inquiry, when notification indicating that a specified handling user is selected, to a second terminal device to which the selected specified handling user is logging in, the inquiry relating to the handling of the execution of the private print; and a job recording unit configured to record, when notification transmitted from the second terminal device and indicating that the handling of the execution of the private print is agreed to is accepted, identification information for identifying the specified handling user thus agreeing and job data that corresponds to the print request accompanied by the private print instruction in association with each other.

6 Claims, 25 Drawing Sheets

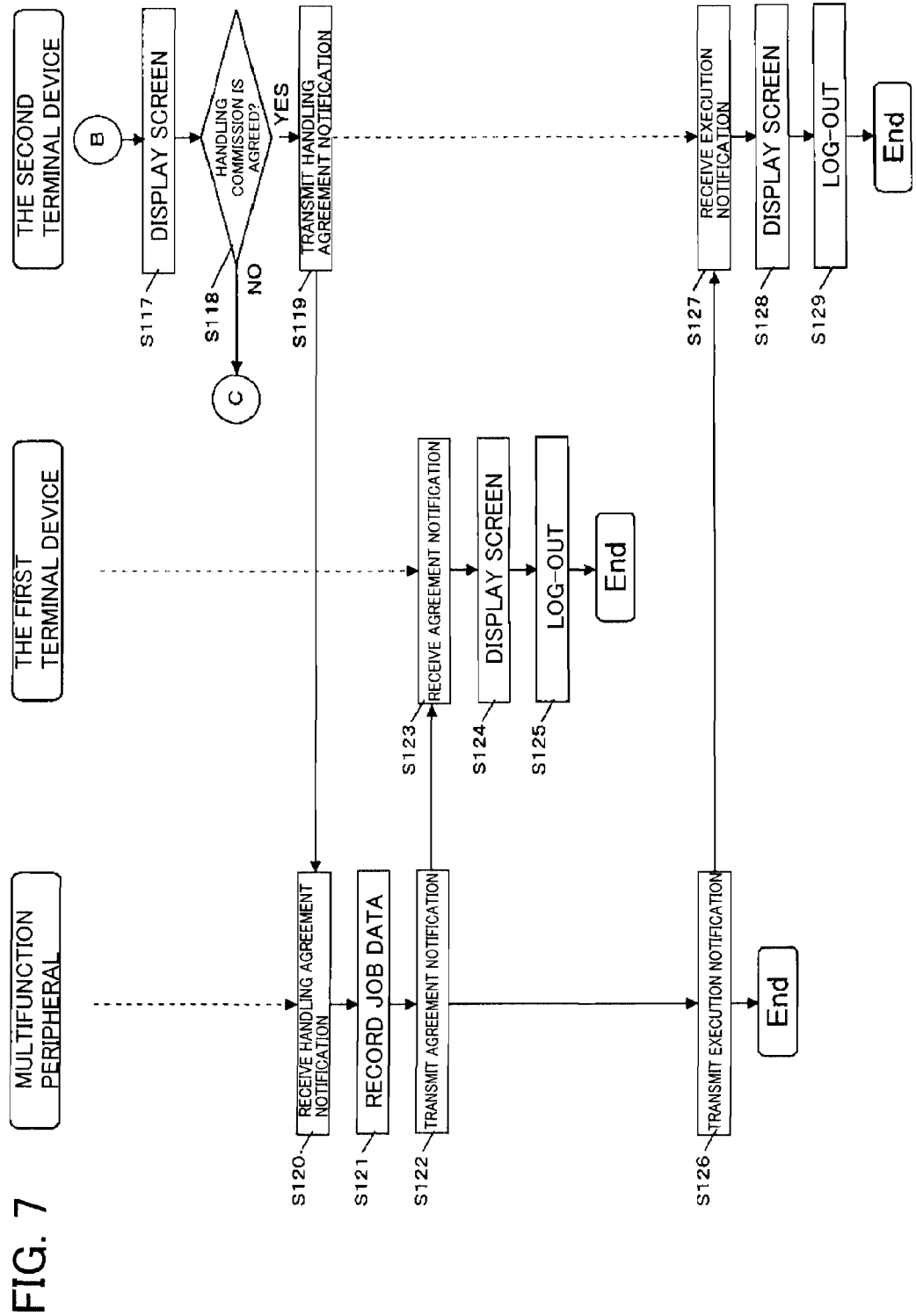

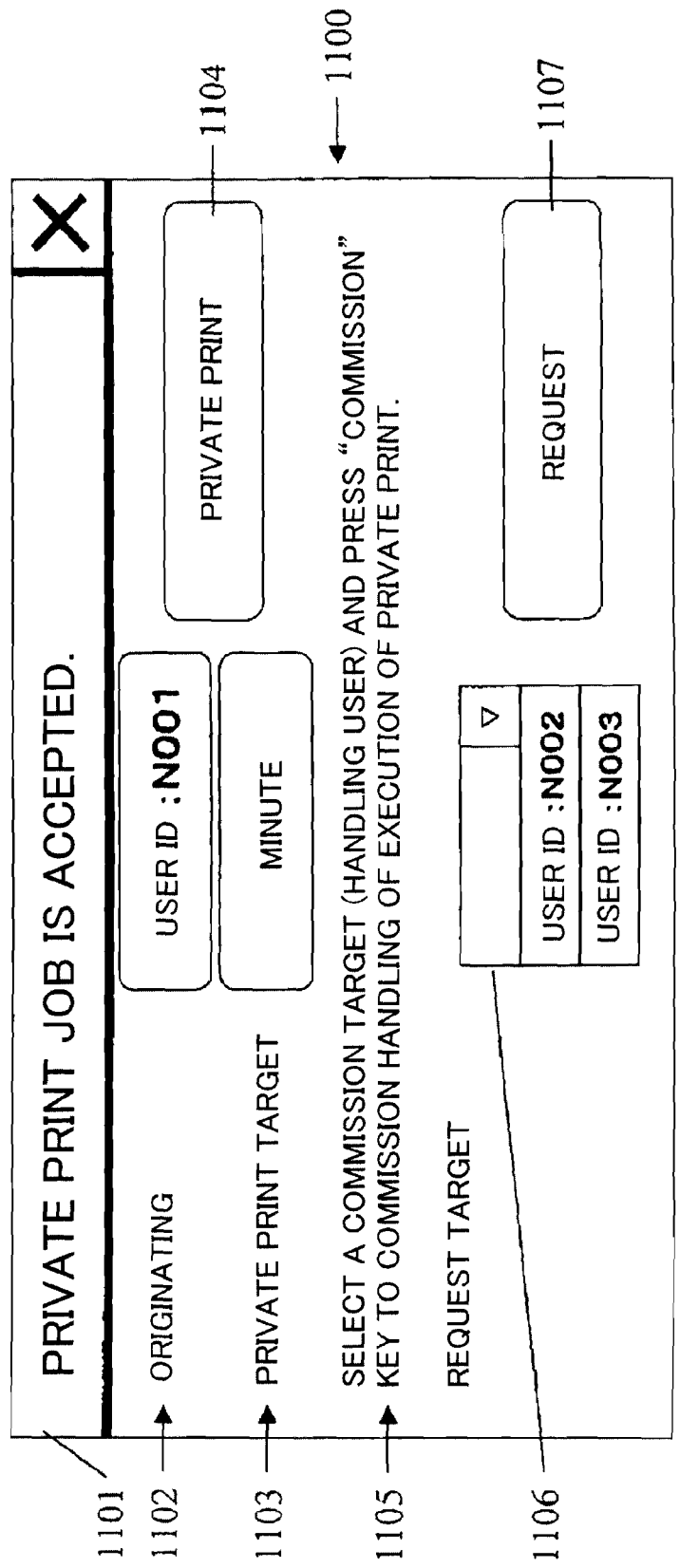

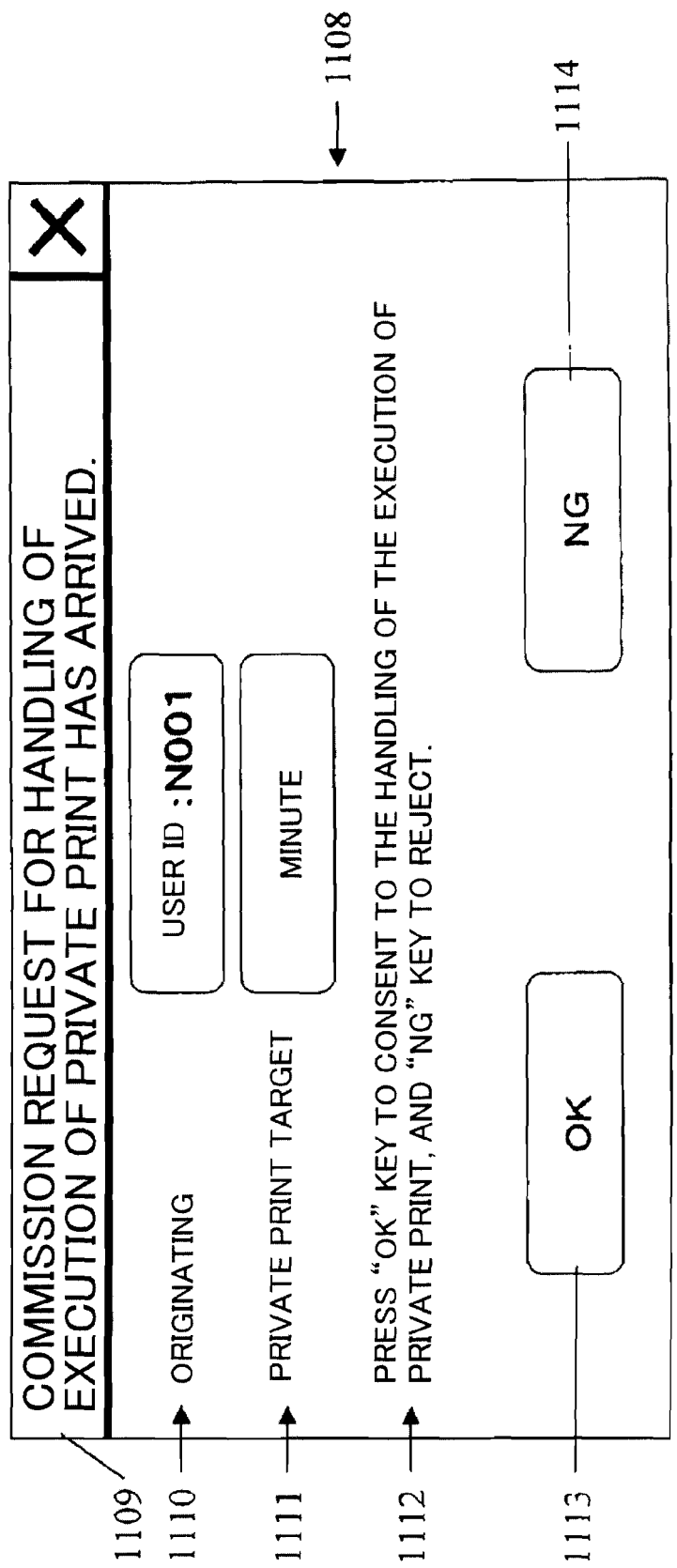

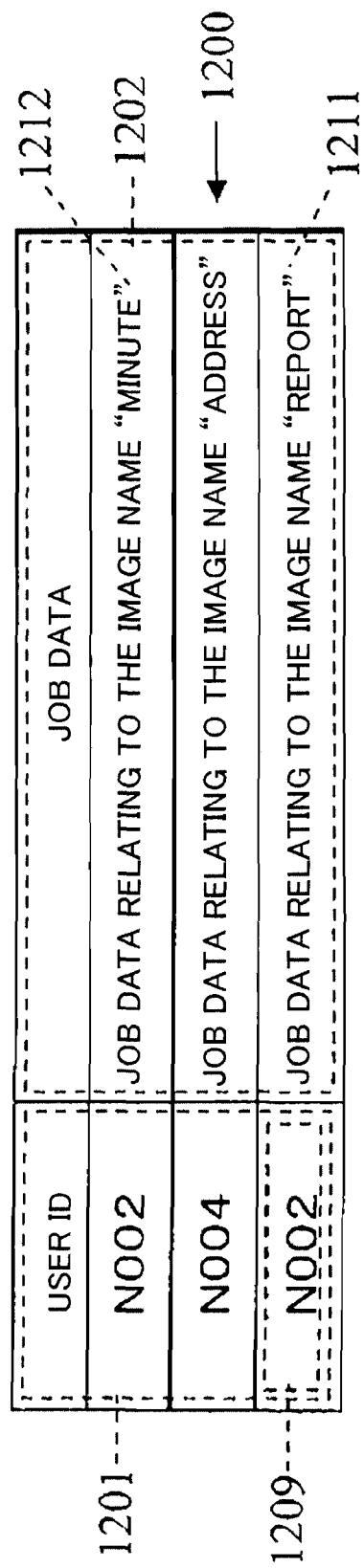
FIG. 10E1

FIG. 10E2
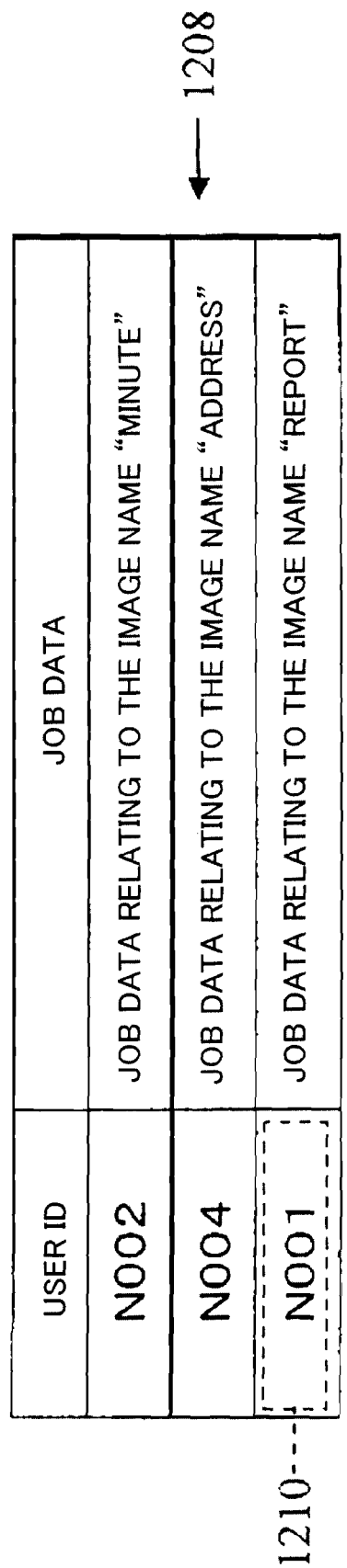

IMAGE FORMING APPARATUS, IMAGE FORMING SYSTEM, AND METHOD OF PRIVATE PRINTING

This application is based on and claims the benefit of priority from Japanese Patent Application No. 2010-034439, filed on 19 Feb. 2010, the content of which is incorporated herein by reference.

BACKGROUND OF THE INVENTION

1. Field of the Invention

The present invention relates to an image forming apparatus such as a printer or a copying machine. The present invention also relates to an image forming system provided with the image forming apparatus. The present invention further relates to a method of private printing using the image forming apparatus.

2. Related Art

In recent years, image forming apparatuses having a box function have been gaining popularity. Such an image forming apparatus is typically configured to provide each user with a storage area called as a "personal box" (also referred to as a "private box") based on the box function. In this case, each user is able to store his or her document data such as image data and text data in the user's own personal box.

Furthermore, image forming apparatuses provided with the functions of a scanner, facsimile, printer, network connection and the like have become increasingly multi-functional. Such a multi-functional image forming apparatus is referred to as a multifunction peripheral or MFP. When the user causes the image forming apparatus to execute a job using a predetermined function, job data indicating the content of the job is stored in the "personal box" described above.

There is a private print function as one of the functions utilizing the box function. When an image forming apparatus provided with the private print function receives job data from a terminal device such as a personal computer (PC) connected to the image forming apparatus, the image forming apparatus temporarily stores identification information of a transmission source (e.g., user ID) in the box along with the job data. Then, when the identification information of the transmission source is inputted via an operating unit provided to the image forming apparatus, the image forming apparatus reads the job data corresponding to the identification information from the box and executes image formation based on the job data. This allows only the originating user who transmitted the job data to acquire an outputted matter (printed matter) based on the job data. In other words, even if the image forming apparatus and the terminal device as the transmission source of the job data are disposed at positions distant from each other, the outputted matter will not be seen by other users. Therefore, the image forming apparatus can improve security relating to confidentiality of the printed matter.

However, image forming apparatuses provided with the private print function have a problem in that, if identification information of a legitimate user is stolen before the legitimate user knows, a different user can abuse the private print function by illegitimately using the identification information of the transmission source and impersonating the legitimate user.

As a technique for solving such a problem, for example, there is disclosed an image processing apparatus capable of accepting a job that is a process to be executed via an operation to an operating unit, as well as from a PC or the like via a network. The image processing apparatus is provided with an authentication recording means in which a user ID, a password, identification information of the PC that the user uses, and an e-mail address of the user are recorded; a means for determining whether or not the user ID and the password that have been inputted match the user ID and the password that are recorded in the authentication recording means when a user ID and password are inputted in response to an authentication request, and for outputting authentication if it is determined to match; a means for discriminating whether or not the user ID and the password that have been inputted are supplied from the user PC recorded in the authentication recording means; and a mail transmission means for notifying, in response to the facts that the discriminating means has discriminated that the user ID and the password have been supplied from other than the user PC and that the authentication has been outputted, the e-mail address recorded in the authentication recording means that the authentication has been made and of the accepted job.

This allows the legitimate user to immediately know of illegitimate use of the image processing apparatus by impersonation via e-mail.

On the other hand, according to the box function utilized by the private print function, job data (e.g., document data) that is once saved in the personal box is only editable (accessible) by limited users (e.g., the owner of the personal box and an administrator) in view of security and data integrity. Therefore, there is a problem in that a user who utilizes the private print function cannot willingly transmit and save one's own job data to and in a personal box of another user.

As a technique for solving such a problem, for example, there is disclosed an access management system capable of managing the right of access to data recorded in a storage device. The access management system is provided with a record controlling means for recording assigned data in a storage device, the assigned data being assigned by a user logged in the access management system to another user; and an access right managing means for, when the assigned data is recorded in the storage device, assigning the right of access to the assigned data to both of the user who has assigned the assigned data and the another user whom the assigned data is assigned, and for erasing the right of access to the user when the user logs out from the access management system.

According to this technique, even when a user transmits and saves data such as document data to and in a box that is not the user's own personal box, both the user as the transmission destination and the originating user can access the data.

However, according to the techniques described above, there is a problem in that the legitimate user is always required to confirm the reception of e-mail, and such reception and confirmation of e-mail is cumbersome.

For example, there is a problem in that, when transmitting and saving job data relating to the private print function to and in another user's personal box using the techniques described above, it takes time and effort for the originating user to receive and confirm e-mail even though the originating user knows the user of the destination.

Furthermore, there is a problem in that control and management of access rights is cumbersome.

For example, there is a problem in that, when transmitting and saving job data relating to the private print function to and in another user's personal box using the techniques described above, the control and management of the access right are carried out even though the originating user rarely accesses the job data; therefore, unnecessary control and management of the right of access are carried out.

The private print function is a highly secure function in which only a user who has transmitted job data to an image forming apparatus can acquire outputted matter of the job data. Due to the high security of the function, in a case in which a user as a representative person of an organization wishes to distribute outputted matter that is outputted using the private print function to a small number of users, for example, the user as the representative person moves to the image forming apparatus and inputs his or her own identification information to have the image forming apparatus output the outputted matter, and distributes the outputted matter to the small number of users. This places too much burden on the user as the representative person of the organization.

Consequently, in a case requiring an urgent action, the user as the representative person informs one of the users as distribution targets (the small number of users) of his or her own identification information and password, and let the informed user as the distribution target to execute the private print and acquire the outputted matter in his or her place. Although informing other users of their own identification information is a least desired action in view of security reasons, there are a number of users as representative persons who take risks in the current situation of the private print function.

In this case, once the identification information and the password are known by another user, it is necessary to reissue identification information and a password to the user as the representative person in order to maintain a level of security, possibly resulting in increased burden as a whole.

SUMMARY OF THE INVENTION

In view of the above problems, one object of the present invention is to provide an image forming apparatus capable of allowing one user to execute a job relating to private print of another user in a simple manner while maintaining security.

Furthermore, another object of the present invention is to provide an image forming system capable of allowing one user to execute a job relating to private print of another user in a simple manner while maintaining security.

Moreover, yet another object of the present invention is to provide a method of private printing capable of allowing one user to execute a job relating to private print of another user in a simple manner while maintaining security.

An image forming apparatus according to the present invention is connected via a communication network with a first terminal device to which a predetermined user is logged in and at least one second terminal device to which a handling user is logged in, the image forming apparatus including: a list transmitting unit that transmits a handling user list to the first terminal device when a print request accompanied by a private print instruction and transmitted from the first terminal device is accepted, the handling user list being provided for selecting a handling user to handle execution of the private print; an inquiring unit that inquires, when notification transmitted from the first terminal device and indicating that a specified handling user is selected from among handling users included in the handling user list is accepted, to a second terminal device to which the selected specified handling user is logged in, as to whether or not to agree to the handling of the execution of the private print; and a job recording unit that records, when notification transmitted from the second terminal device and indicating that the handling of the execution of the private print is agreed to is accepted, identification information for identifying the specified handling user logged in the second terminal device thus agreeing and job data that corresponds to the print request accompanied by the private print instruction in association with each other.

Furthermore, a method of private printing according to the present invention utilizes an image forming apparatus that is connected via a communication network with a first terminal device to which a predetermined user is logged in and at least one second terminal device to which a handling user is logged in, the method including: a list transmitting step of the image forming apparatus transmitting a handling user list to the first terminal device when a print request accompanied by a private print instruction and transmitted from the first terminal device is accepted, the handling user list being provided for selecting a handling user to handle execution of the private print; an inquiring step of the image forming apparatus inquiring, when notification transmitted from the first terminal device and indicating that a specified handling user is selected from among handling users included in the handling user list is accepted, to a second terminal device to which the selected specified handling user is logged in, as to whether or not to agree to the handling of the execution of the private print; and a job recording step of the image forming apparatus recording, when notification transmitted from the second terminal device and indicating that the handling of the execution of the private print is agreed to is accepted, identification information for identifying the specified handling user logged in the second terminal device thus agreeing and job data that corresponds to the print request accompanied by the private print instruction in association with each other.

Moreover, an image forming system according to the present invention is provided with: a first terminal device to which a predetermined user is logged in; at least one second terminal devices to which a handling user is logged in; and an image forming apparatus that is connected to the first terminal device and the at least one second terminal device via a communication network, in which the image forming apparatus includes: a list transmitting unit that transmits a handling user list to the first terminal device when a print request accompanied by a private print instruction and transmitted from the first terminal device is accepted, the handling user list being provided for selecting a handling user to handle execution of the private print; an inquiring unit that inquires, when notification transmitted from the first terminal device and indicating that a specified handling user is selected from among handling users included in the handling user list is accepted, to a second terminal device to which the selected specified handling user is logged in, as to whether or not to agree to the handling of the execution of the private print; and a job recording unit that records, when notification transmitted from the second terminal device and indicating that the handling of the execution of the private print is agreed to is accepted, identification information for identifying the specified handling user logged in the second terminal device thus agreeing and job data that corresponds to the print request accompanied by the private print instruction in association with each other, in which the first terminal device includes: a requesting unit that transmits the print request accompanied by the private print instruction to the image forming apparatus; and a selecting unit that prompts the predetermined user, when the handling user list transmitted from the image forming apparatus is received, to select a specified handling user from among the handling users included in the handling user list, and in which each of the at least one second terminal device includes: a responding unit that prompts the handling user, when having received an inquiry as to whether or not to agree to the handling of the execution of the private print transmitted from the image forming apparatus is received, to make a response of agreeing or refusing to the handling of the execution of the private print.

According to the present invention, it is possible to provide an image forming apparatus capable of allowing one user to execute a job relating to private print of another user in a simple manner while maintaining security.

Further, according to the present invention, it is possible to provide an image forming system capable of allowing one user to execute a job relating to private print of another user in a simple manner while maintaining security.

Moreover, according to the present invention, it is possible to provide a method of private printing capable of allowing one user to execute a job relating to private print of another user in a simple manner while maintaining security.

BRIEF DESCRIPTION OF THE DRAWINGS

FIG. 7 is a second flowchart of the procedure for accepting the private print job according to the first embodiment of the present invention;

FIG. 10C is an illustration of one example of a handling user selection screen 1100 that is displayed on the display of the first terminal device 120C1 according to the first embodiment of the present invention;

FIG. 10D is an illustration of one example of a handling agree/refuse selection screen 1108 that is displayed on a display of a second terminal device 120C2 according to the first embodiment of the present invention;

FIG. 10E1 is an illustration of one example of a job table 1200 according to the first embodiment of the present invention;

FIG. 10E2 is an illustration of one example of another job table 1208 according to the first embodiment of the present invention;

DETAILED DESCRIPTION OF THE INVENTION

The following describes embodiments of an image forming apparatus according to the present invention with reference to the accompanying drawings for better understanding of the present invention. It should be noted that the following embodiments are mere examples of implementation of the present invention, and in no way restrict the technical scope of the present invention. As used herein, an alphabetical letter "S" prefixed to a number in the flowcharts represents a step.

Image Forming Apparatus and Terminal Device

The image forming apparatus according to the present invention is applicable, for example, to a printer or a scanner alone, or to a multifunction peripheral provided with a printer, a copying machine, a scanner, a facsimile, and the like.

Figure 1:
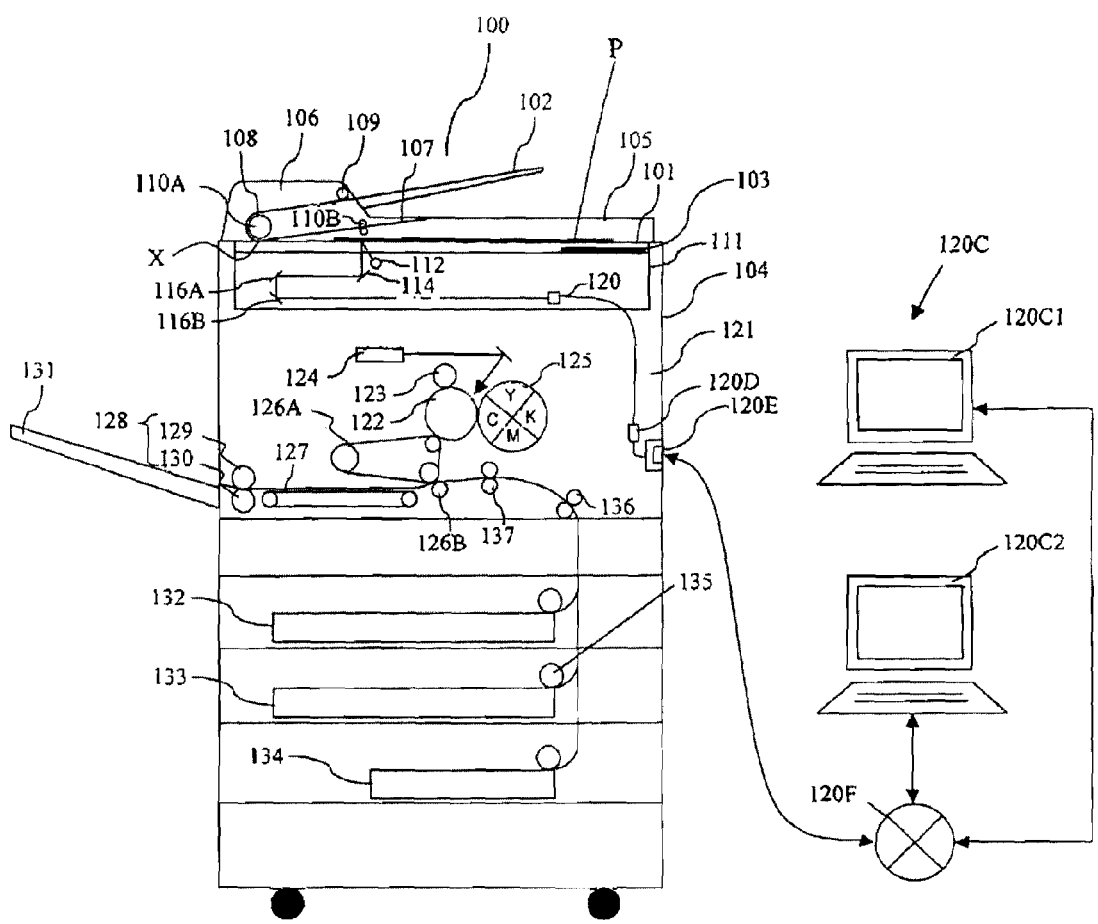
FIG. 1 is a schematic view illustrating an entire configuration within a multifunction peripheral 100 according to the present invention.

FIG. 1 is a schematic view illustrating an entire configuration within a multifunction peripheral 100 according to the present invention. However, the details of each component not directly related to the present invention are omitted. Here, operation of the multifunction peripheral 100 is briefly described taking an example in which a function of copying a document utilizing the multifunction peripheral 100 is provided.

When printing a document P using the multifunction peripheral 100, for example, a user places the document P on a platen 101 or a document tray 102 shown in FIG. 1, and makes an instruction for printing on an operating unit 103 disposed near the platen 101. The user inputs copy setting conditions (such as a number of copies or a size), for example, to the multifunction peripheral 100 through the operating unit 103. By inputting the copy setting conditions and the instruction for copying through the operating unit 103, components (driving units) described below operate, and printing (image formation to a sheet) is performed.

Specifically, as shown in FIG. 1, the multifunction peripheral 100 according to the present embodiment is provided with a main body 104 and a platen cover 105 disposed above the main body 104. The platen 101 is disposed on an upper surface of the main body 104. The platen 101 is configured to be opened and closed with the platen cover 105. The platen cover 105 is provided with an automatic document feeder 106, the document tray 102, and a discharging tray 107.

The automatic document feeder 106 is configured by a document carrier path 108, a pickup roller 109, carrying rollers 110A and 110B, and the like, all of which are provided within the platen cover 105. The document carrier path 108 is a carrier path for a document communicating from the document tray 102 to the discharging tray 107 via a read position X at which reading is carried out by an image reading unit 111 provided to the main body 104.

The automatic document feeder 106 picks up a plurality of document sheets placed on the document tray 102 into the document carrier path 108 one by one using the pickup roller 109, causes the picked up document sheets to pass through the read position X using the carrying roller and the like, and discharges the document sheets to the discharging tray 107 using the carrying roller 110B. While passing through the read position X, the document is read by the image reading unit 111.

Figure 2:
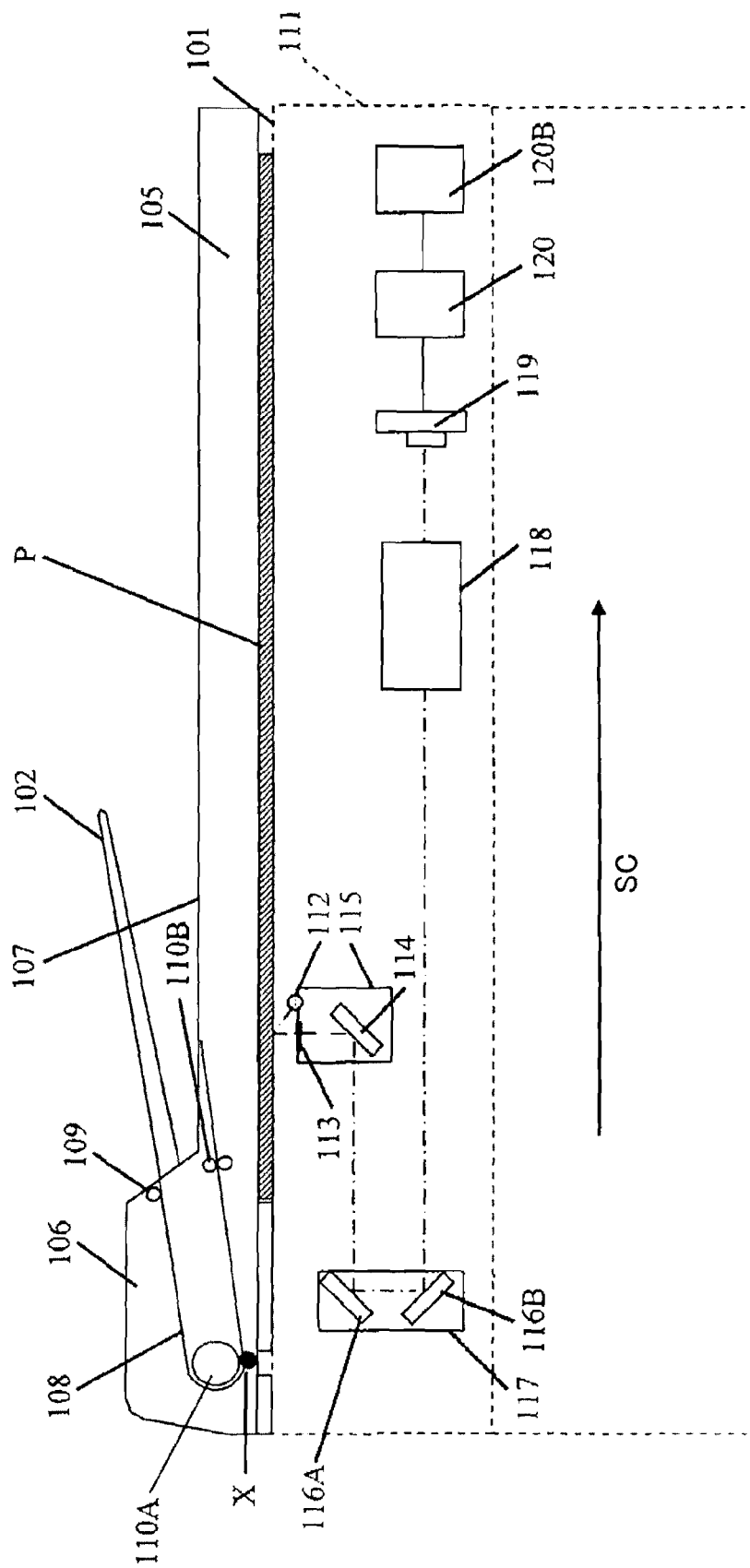
FIG. 2 is an enlarged view illustrating an image reading unit 111 according to the present invention.

The image reading unit 111 is disposed under the platen 101. The details of the image reading unit 111 are illustrated in FIG. 2. The image reading unit 111 is provided with a first movable carriage 115 including a light source 112 elongated in a scan direction and configured to irradiate the platen 101, a slit 113 configured to selectively transmit light from the platen 101, and a mirror 114 configured to guide the light from the platen 101, a second movable carriage 117 including mirrors 116A and 116B configured to re-reflect reflected light from the first movable carriage 115, a lens group 118 configured to optically correct the light guided by the mirror, an image pickup device 119 configured to receive the light corrected by the lens group 118, and an image data generating unit 120 configured to convert the light received by the image pickup device 119 into electrical signals and perform correction processing, image quality processing, compression processing, or the like as needed.

When reading the document on the automatic document feeder 106, the light source 112 moves to a position at which the read position X can be irradiated and emits light. The light from the light source 112 is transmitted through the platen 101 and reflected on the document that passes through the read position X, and is guided toward the image pickup device 119 by means of the slit 113, the mirrors 114, 116A, and 116B, and the lens group 118. The image pickup device 119 converts the received light into electrical signals, and transmits the electrical signals to the image data generating unit 120. The light received by the image pickup device 119 is inputted to the image data generating unit 120 as analog electrical signals of R (red), G (green), and B (blue). The image data generating unit 120 performs analog-digital conversion, i.e. digitalizes, the analog electrical signals. Furthermore, the image data generating unit 120 takes the sequentially converted digitalized signal as a piece of unit data (concentration value), and performs correction processing, image quality processing, compression processing, or the like on the piece of unit data, thereby generating image data configured by a plurality of pieces of unit data.

Moreover, the image reading unit 111 is able to read a document sheet placed on the platen 101, in addition to the document carried by the automatic document feeder 106. When reading the document sheet placed on the platen 101, the first movable carriage 115 moves in a sub scan direction (SC) while causing the light source 112 to emit light, and the second movable carriage 117 moves in a direction toward the image pickup device 119 at half the speed of the first movable carriage 115 so as to make a length of a light path from the light source 112 to the image pickup device 119 constant.

Similarly to the case of the document carried by the automatic document feeder 106, the image pickup device 119 converts light from the document placed on the platen 101 into electrical signals based on light guided by the mirrors 114, 116A, and 116B, and the image data generating unit 120 generates image data (document data) based on the converted signals and records the image data in a recording unit 120B.

Under the recording unit 120B of the main body 104, there is provided a communication unit 120D configured to receive job data including the image data from a plurality of terminal devices 120C (e.g., a first terminal device 120C1 and a second terminal device 120C2) such as personal computers (PC), and to transmit screen information described later to the first terminal device 120C1 and the second terminal device 120C2. The communication unit 120D receives the job data from the first terminal device 120C1 and the second terminal device 120C2 connected to a network 120F via a network interface 120E, and transmits the screen information to the first terminal device 120C1 and the second terminal device 120C2.

Furthermore, each terminal device 120C is provided with a display on which a screen is displayed, a keyboard through which a key input or the like is made, and a control unit configured to control the display and the keyboard. For example, when the user inputs job data using the keyboard, the control unit of the terminal device 120C receives the job data and transmits the received job data to the multifunction peripheral 100. Further, when the control unit of the terminal device 120C receives screen information from the multifunction peripheral 100, a screen (image) corresponding to the screen information is displayed on the display (described later). It should be noted that, since the configuration and operation of the terminal device 120C (e.g., the second terminal device 120C2) are the same as those of the first terminal device 120C1, explanations thereof are omitted.

Moreover, the multifunction peripheral 100 according to the present invention is further provided with an image forming unit 121 configured to execute the processing of the copying function. The image forming unit 121 is disposed under the image reading unit 111 of the main body 104, and prints (outputs) the image data recorded in the recording unit 120B. Examples of image data (job data) that the image forming unit 121 is able to print include image data generated by the image data generating unit 120 as described above, and image data received from the first terminal device 120C1, the second terminal device 120C2, etc. connected to the multifunction peripheral 100 and the network 120F via the network 120F.

The printing method employed by the image forming unit 121 is the xerographic method. The xerographic method is a method of forming a latent image on the photoconductor drum 122 by charging the photoconductor drum 122 evenly using a charger 123, and then irradiating the photoconductor drum 122 by a laser 124, and forming a visible image by attaching toner by a developer 125, and transferring the visible image to a transfer medium using a transfer roller.

In a case of an image forming apparatus that supports a full color image, the developer (rotary developer) 125 rotates in a circumferential direction about a rotational axis that is perpendicular to the paper surface in FIG. 1, and a developing unit containing toner of a corresponding color is provided at a position opposing the photoconductor drum 122. In this state, the latent image on the photoconductor drum 122 is developed by the toner contained in the developer 125, and is transferred to an intermediate transfer belt 126A. It should be noted that the developer 125 includes four developing units 125(Y), 125(C), 125(M), and 125(K) respectively containing toner of yellow (Y), cyan (C), magenta (M), and black (K). By performing the transfer to the intermediate transfer belt 126A for each color, a full color image is formed on the intermediate transfer belt 126A. The transfer medium on which the visible image is printed, i.e. printing sheet, is one of those placed in paper feed trays such as paper cassettes 132, 133, and 134.

When performing the printing, the image forming unit 121 picks up a single transfer medium from one of the paper feed trays using a pickup roller 135, and feeds the picked up transfer medium between the intermediate transfer belt 126A and a transfer roller 126B using a carrying roller 136 and a resist roller 137. The image forming unit 121 transfers the visible image on the intermediate transfer belt 126A to the transfer medium that has been fed between the intermediate transfer belt 126A and the transfer roller 126B, and carries the transfer medium to a fusing unit 128 (fuser) using a carrying belt 127 in order to fuse the visible image. The fusing unit 128 is provided with a heating roller 129 having a built-in heater, and a pressure roller 130 that is pressed against the heating roller 129 at a predetermined pressure. When the transfer medium passes between the heating roller 129 and the pressure roller 130, the visible image is fused to the transfer medium by heat and a pressing force applied on the transfer medium. The transfer medium on which the fusing has been performed is discharged to a discharge tray 131.

The processing of the copying function of the multifunction peripheral 100 is performed according to the above procedure.

Figure 3:
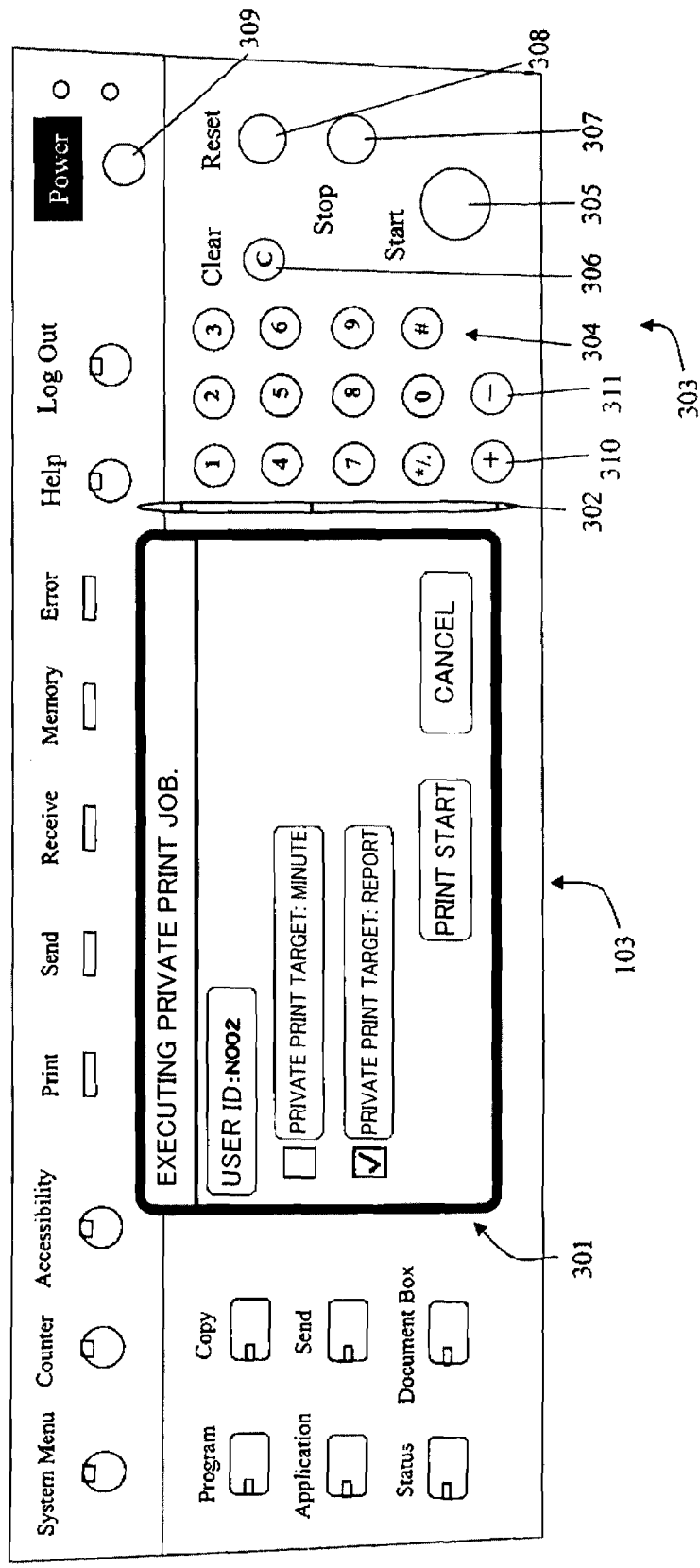
FIG. 3 is a schematic view illustrating an entire configuration of an operating unit 103 according to the present invention.

FIG. 3 is a schematic view illustrating one example of an external appearance of the operating unit 103 according to the present invention. The user operates the operating unit 103 to input copy setting conditions relating to the copying function described above, for example, such as the number of sheets to be printed and the size of printing sheet, to activate a private print function that will be later described, to input a predetermined user ID, and to confirm the copy setting condition, the user ID that have been inputted, and the like. When inputting the setting conditions and the like, a touch screen 301, a stylus pen 302, or an operation key 303 provided for the operating unit 103 is used.

The touch screen 301 is provided with both a function for inputting the copy setting conditions and the like and a function for displaying the copy setting conditions and the like. For example, a predetermined screen is displayed on the touch screen 301 by means of the display previously provided behind the touch screen 301, and, by pressing (selecting) a key within the screen displayed on the touch screen 301, copy setting conditions associated with the key are inputted to the multifunction peripheral 100. As a background color of a region corresponding to the pressed key and the like changes from white to gray in conjunction with the pressing, the user is able to visually identify whether or not the key and the like is being pressed by the background color of the key and the like. This also applies when inputting the predetermined user ID.

Furthermore, a stylus pen 302 is provided near the touch screen 301. When the user touches the touch screen 301 with the tip end of the stylus pen 302, a sensor disposed under the touch screen senses a contacted point. As the tip end of the stylus pen is almost a point, the sensor is able to sense the contacted point, for example, by the dot (minimum unit). Therefore, as compared to a case of specifying a position on the touch screen 301 using a finger, for example, it is possible to specify a position of a smaller area more accurately using the stylus pen 302. The user can select a key and the like displayed on the touch screen 301 using the stylus pen 302, instead of the user's finger.

Furthermore, the operation keys 303 including a predetermined number of operation hardware keys are provided near the touch screen 301. For example, the operation keys 303 include number keys 304, a start key 305, a clear key 306, a stop key 307, a reset key 308, a power key 309, a hardware up key 310, and a hardware down key 311.

Figure 4:
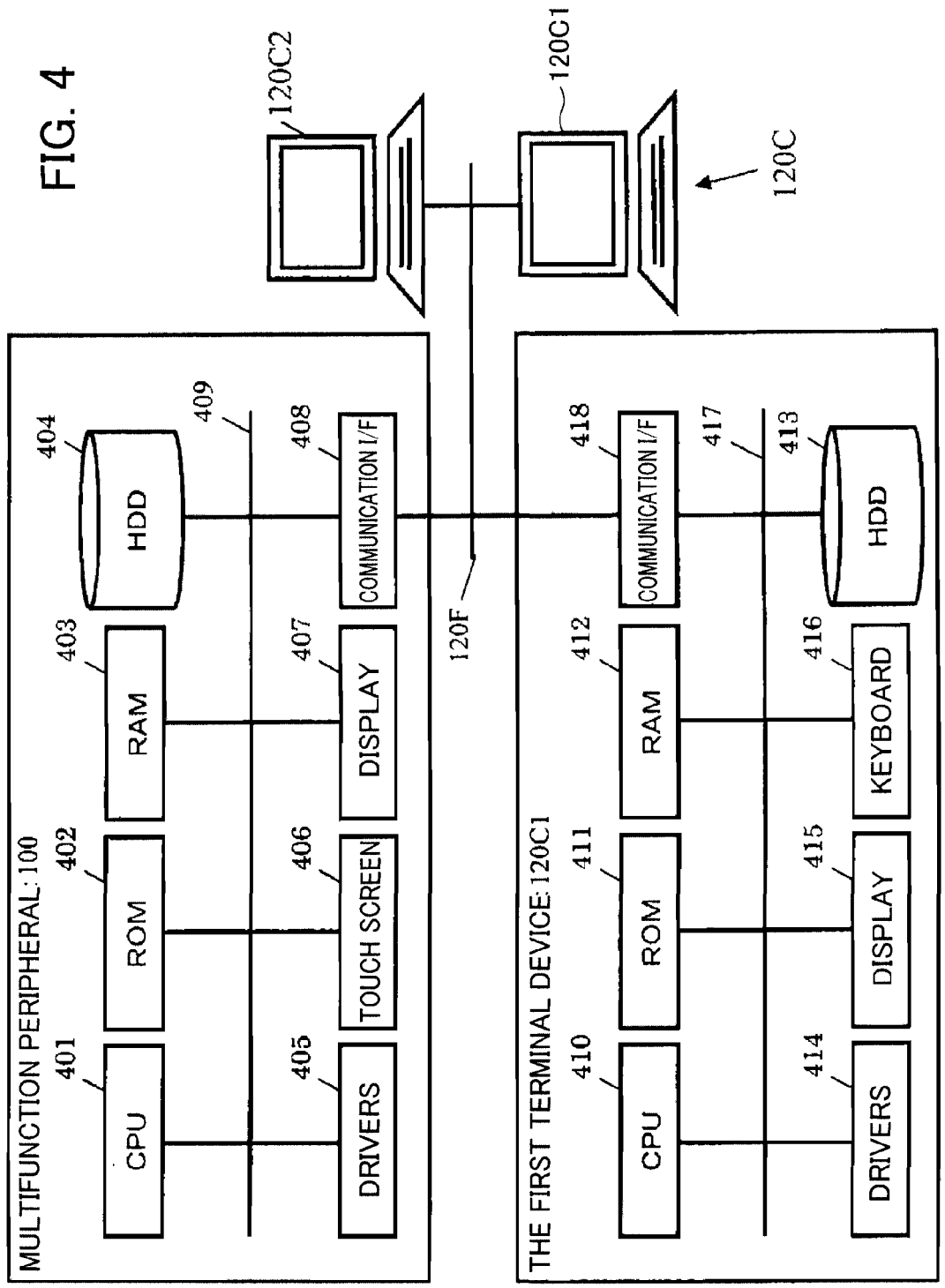
FIG. 4 is a view illustrating a hardware configuration of a control system of the multifunction peripheral 100 and a hardware configuration of a control system of a terminal device 120C connected to the multifunction peripheral 100 via a network 120F, according to the present invention.

Next, with reference to FIG. 4, hardware configurations of control systems of the multifunction peripheral 100 and the plurality of terminal devices 120C connected to the multifunction peripheral 100 are described. FIG. 4 is a view illustrating the hardware configurations of the control systems of the multifunction peripheral 100 according to the present invention and the terminal device 120C connected to the multifunction peripheral 100 via the network 120F. However, the details of each not directly related to the present invention are omitted.

A control circuit of the multifunction peripheral 100 is configured such that a CPU (Central Processing Unit) 401, ROM (Read Only Memory) 402, RAM (Random Access Memory) 403, a HDD (Hard Disk Drive) 404, drivers 405 respectively corresponding to the driving units, a touch screen 406 (301), a display 407, and a communication interface 408 are connected via an internal bus 409. The CPU 401 uses the RAM 403 as a working area, for example, to execute programs recorded in the ROM 402 and the HDD 404, receives data, instructions, commands and the like from the drivers 405 and the touch screen 406 provided for the operating unit 103 corresponding to the keys based on a result of the execution, and controls an operation of each driving unit shown in FIG. 1. Furthermore, the CPU 401 transmits data to the display 407 disposed behind the touch screen 406, for example, and causes a predetermined screen to be displayed on the touch screen 406. Moreover, effects of each means (unit) other than the driving units (shown in FIG. 5) are also realized by the CPU 401 executing programs. Programs and data that realize the means described below are recorded in the ROM 402, the HDD 404, or the like. Furthermore, the communication interface 408 is connected to the terminal device 120C (e.g., the first terminal device 120C1) or the like that is another device via the network 120F (a communication cable connected to the network 120F). The CPU 401 transmits information to the terminal device 120C via the communication interface 408, causes a predetermined screen to be displayed on a display 415 of the terminal device 120C, and transmits and receives data, instructions, commands, and the like to and from the terminal device 120C.

In addition, the control circuit of the first terminal device 120C1 out of the plurality of terminal devices 120C connected to the network 120F is connected to a CPU 410, ROM 411, RAM 412, a HDD 413, drivers 414 respectively corresponding to the control units, the display 415, a keyboard 416, and a communication interface 418 via an internal bus 417. The CPU 410 receives data, instructions, commands and the like from the multifunction peripheral 100 via the communication interface 418, for example, causes a predetermined screen to be displayed on the display 415 based on the information and the like, receives instructions, commands and the like outputted from the keyboard 416 or a mouse that is not illustrated, transmits the received instructions and commands to the CPU 401 of the multifunction peripheral 100, and controls the operation of each control unit. The ROM 411 and the HDD 413 records authentication information such as an user ID and a password in advance, and, upon reception of a predetermined user ID and a predetermined password from the keyboard 416, the CPU 410 of the first terminal device 120C1 executes user authentication based on the received user ID and the like and the recorded authentication information (later described). It should be noted that a control circuit of a different terminal devices 120C (e.g., the second terminal device 120C2) connected to the network 120F also has the same configuration as the control circuit of the first terminal device 120C1; therefore, explanation thereof is omitted. Furthermore, it is possible to use a specified terminal device out of the plurality of terminal devices 120C connected to the network 120F as a server that manages the network.

First Embodiment

Figure 5:
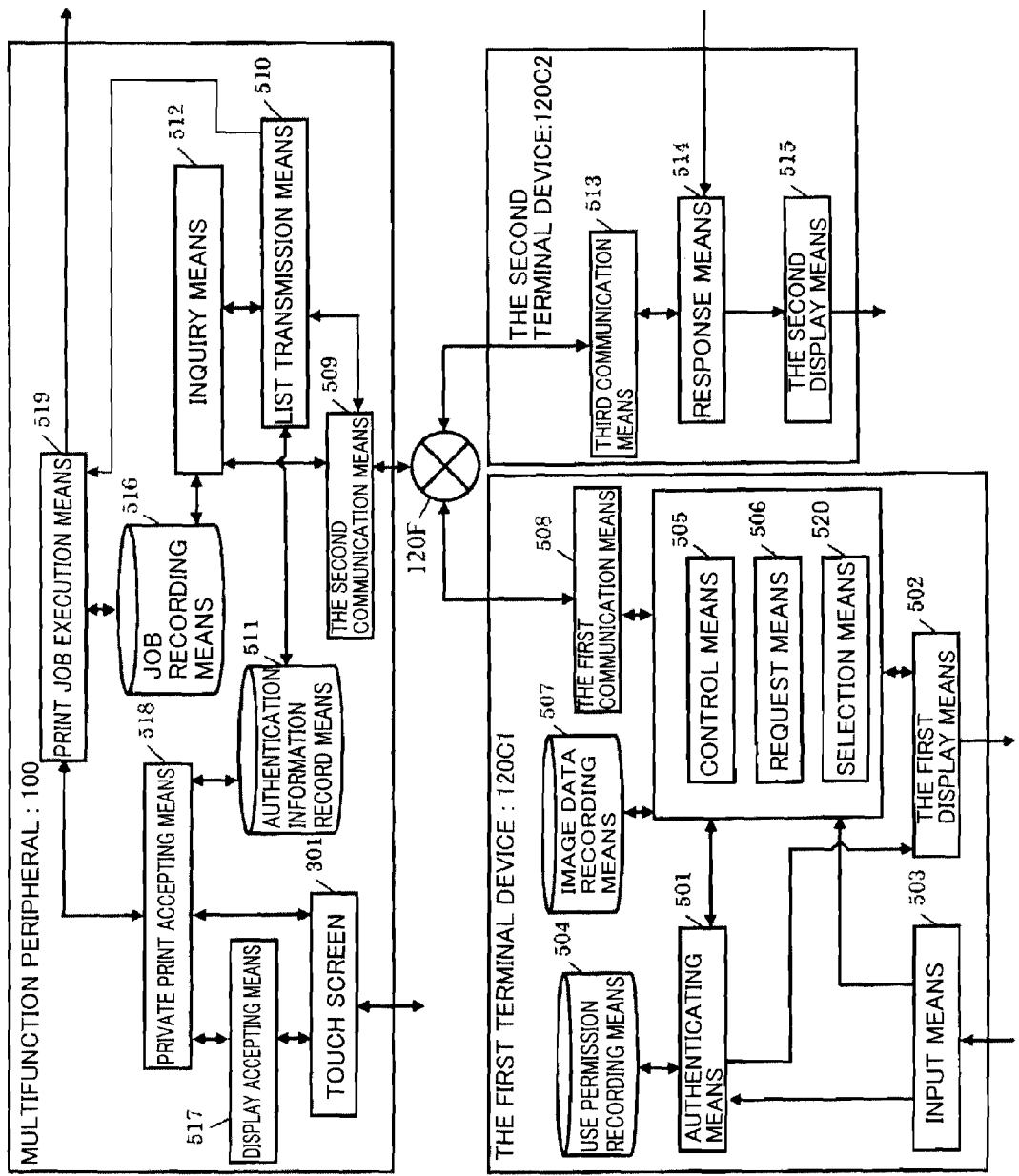
FIG. 5 is a functional block diagram illustrating the multifunction peripheral 100 and the terminal device 120C according to a first embodiment of the present invention.
Figure 6:
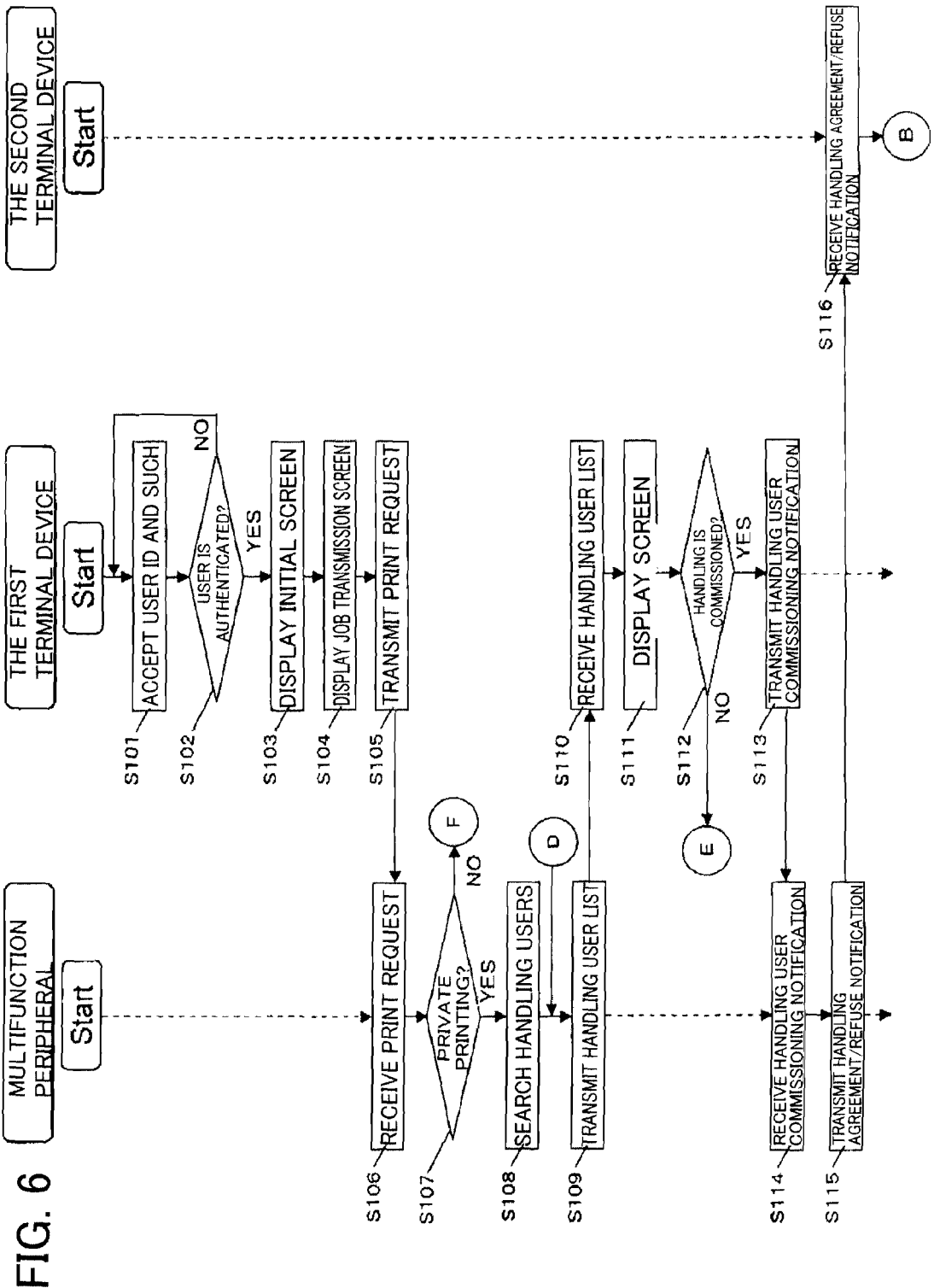
FIG. 6 is a first flowchart of a procedure for accepting a private print job according to the first embodiment of the present invention.
Figure 8A:
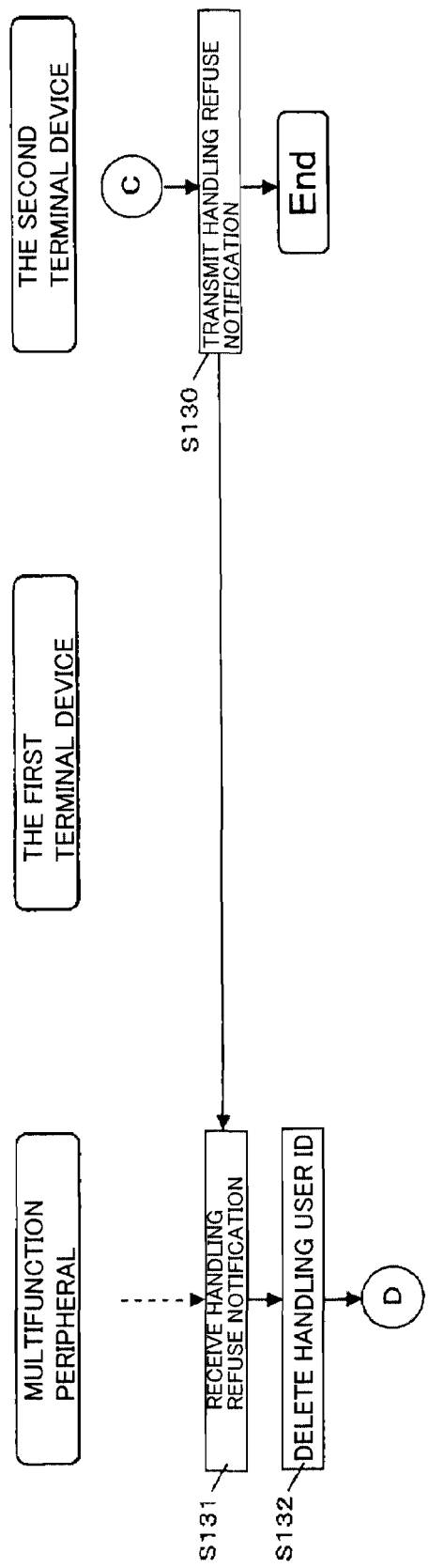
FIG. 8A to 8C are a third flowchart of the procedure for accepting the private print job according to the first embodiment of the present invention.
Figure 8B:
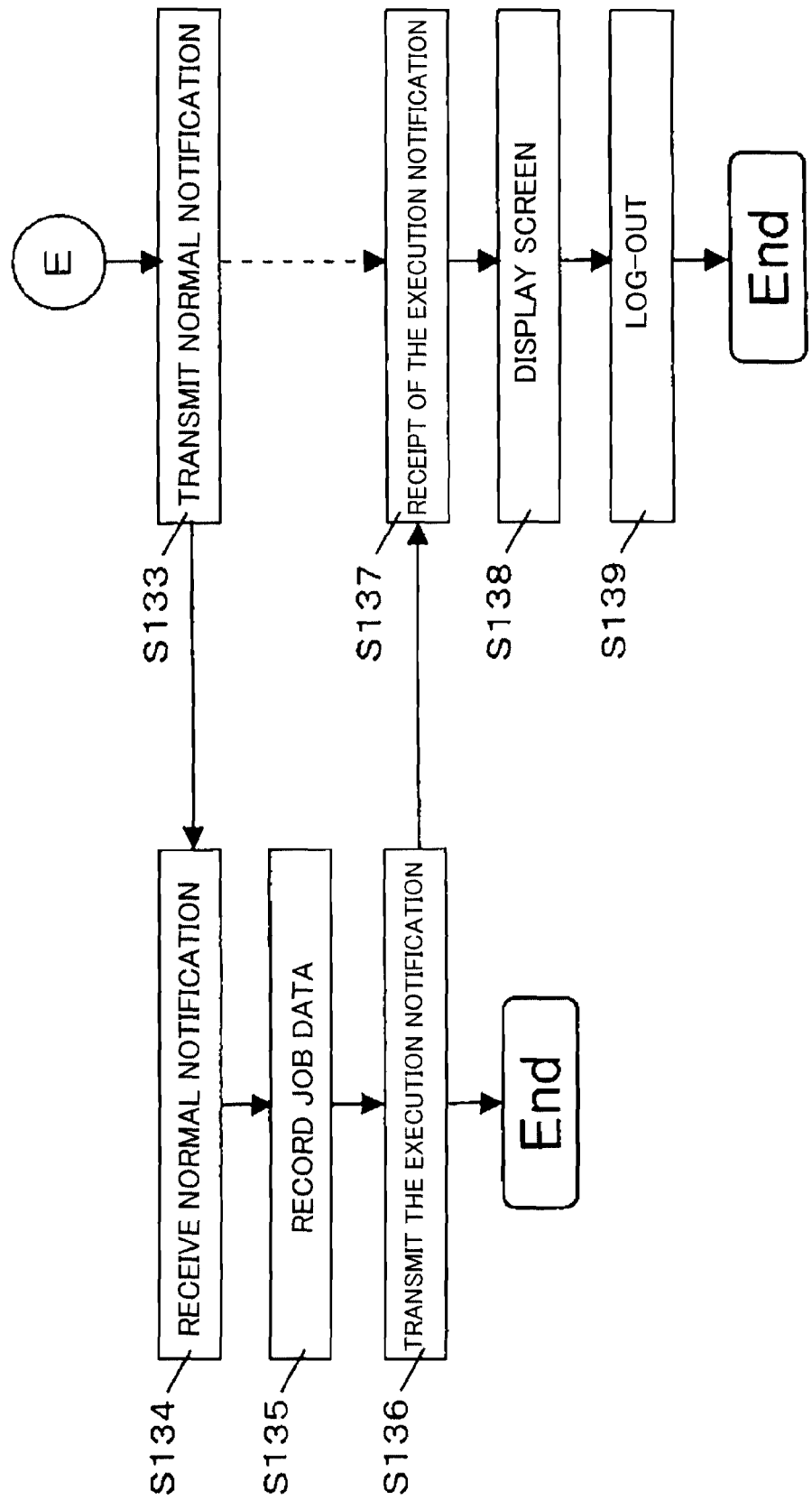
Figure 8C:
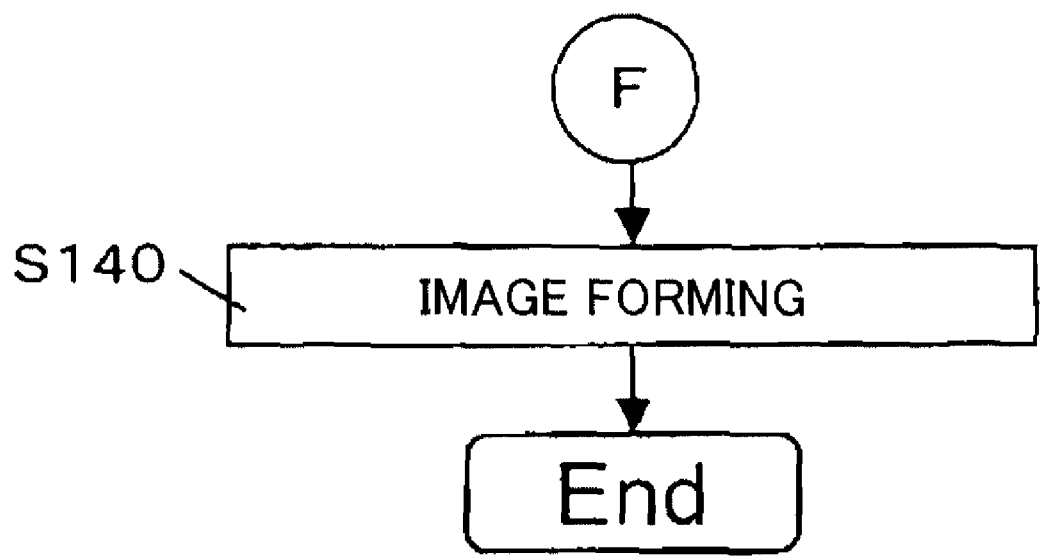
Figure 9:
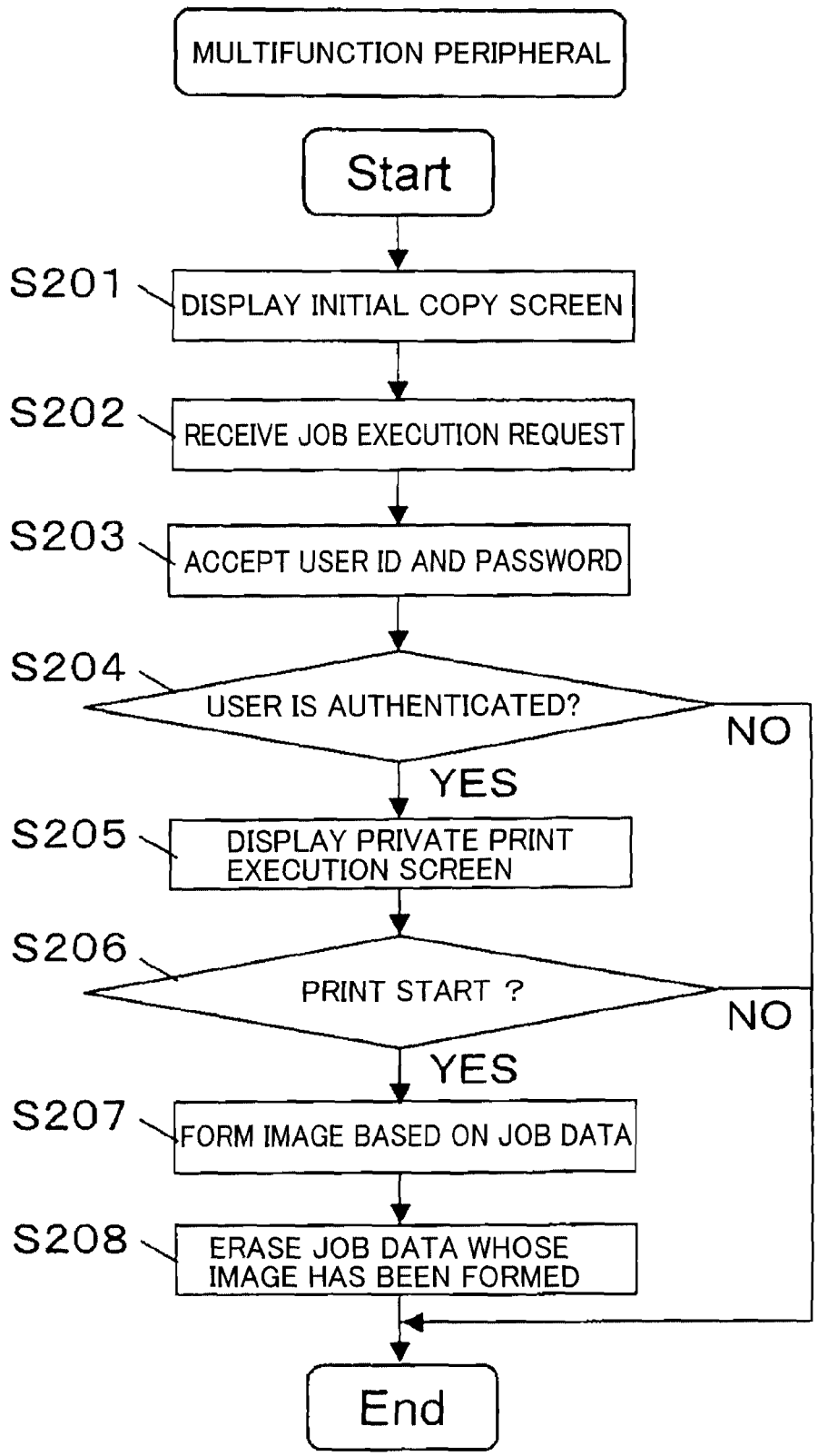
FIG. 9 is a flowchart of a procedure for executing the private print job according to the first embodiment of the present invention.

The following describes a procedure in which the multifunction peripheral 100 and the terminal device 120C according to a first embodiment of the present invention easily allows another user to execute a job relating to private print of the own while maintaining security, with reference to FIG. 5 to FIG. 9. FIG. 5 is a functional block diagram illustrating the multifunction peripheral 100 and the terminal device 120C according to the first embodiment of the present invention. FIGS. 6 to 8 are flowcharts of a procedure for accepting the private print job according to the first embodiment of the present invention. FIG. 9 is a flowchart of a procedure for executing the private print job according to the first embodiment of the present invention.

Acceptance of Private Print Job

First, when the first terminal device 120C1 connected to the multifunction peripheral 100 via the network 120F is powered on by a predetermined user (first user), an authenticating means 501 of the first terminal device 120C1 causes a first display means 502 such as a display to display an authentication screen (not illustrated). Then, the first terminal device 120C1 accepts, from the first user, an input of user identification information (user ID, for example, "N001") for identifying the user and a password that corresponds to the user identification information (Step S101 in FIG. 6).

When the first user inputs the user ID ("N001") and the password (e.g., "ABC") of the user using the first input means 503 such as a keyboard or a mouse while looking at the authentication screen and presses (selects) an "OK" key, the authenticating means 501 authenticates whether the user is the first user (or not) based on the inputted user ID (first inputted user ID), the inputted password (first inputted password), and a use permission table previously recorded in a use permission recording means 504 (Step S102 in FIG. 6).

Figure 10A:
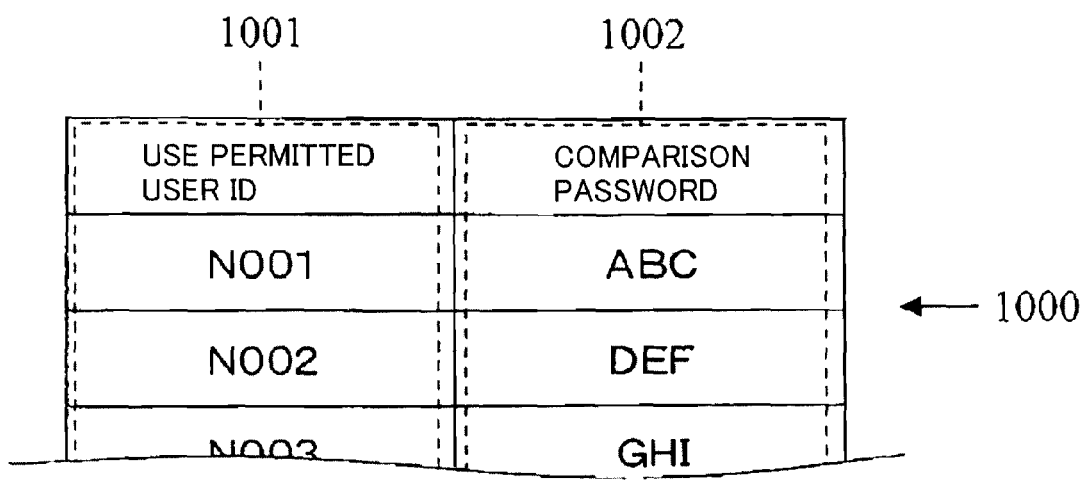
FIG. 10A is an illustration of one example of a first use permission table 1000 according to the first embodiment of the present invention.

FIG. 10A is an illustration of one example of a use permission table 1000 according to the first embodiment of the present invention.

In the use permission table 1000, as shown in FIG. 10A, a user ID 1001 permitted to use the terminal device (use permitted user ID) and a password 1002 that is issued to the use permitted user ID 1001 (comparison password) are recorded in association with each other.

The authenticating means 501 first judges whether or not the first inputted user ID matches the use permitted user ID 1001 recorded in the use permission table 1000. Next, if matching, the authenticating means 501 further judges whether or not the first inputted password matches a comparison password 1002 corresponding to the use permitted user ID 1001 that has matched the first inputted user ID.

Then, as a result of the judgment, if the first inputted user ID does not match the use permitted user ID 1001, or if the first inputted password does not match the comparison password 1002 (NO in Step S102 in FIG. 6), the authenticating means 501 prevents the first user from logging in, erases the first inputted user ID and the first inputted password, and causes the first display means 502 to display the authentication screen again. The multifunction peripheral 100 then enters a state ready to accept a new (valid) user ID and a new (valid) password from the first user (Step S101 in FIG. 6).

On the other hand, if it has been judged that the first inputted user ID matches the use permitted user ID 1001 and the first inputted password matches the comparison password (YES in Step S102 in FIG. 6), the authenticating means 501 notifies the control means 505 of this judgment, and allows the first user to log in (login success). The control means 505 that has received the notification causes the first display means 502 to display an initial screen (not illustrated) relating to the first terminal device 120C1, and starts accepting a command for predetermined processing from the first user (Step S103 in FIG. 6).

The first user selects a private print mode for transmitting a request for a private print job to an image forming apparatus (e.g., the multifunction peripheral 100) using the first input means 503 while looking at the initial screen relating to the first terminal device 120C1. With this, the control means 505 accepts the selection of the private print mode, and notifies the request means 506 of the selection. Upon receipt of the notification, the request means 506 acquires previously recorded image data (image data as a candidate of the print request) from image data recording means 507 provided to the first terminal device 120C1, and acquires device identification information (e.g., device name "Multifunction Peripheral M001") of an image forming apparatus with which communication is possible at this moment from the first communication means 508. Then, the request means 506 causes the first display means 502 to display a job transmission screen for transmitting a print request accompanied by a private print instruction to a predetermined image forming apparatus (Step S104 in FIG. 6).

Figure 10B:
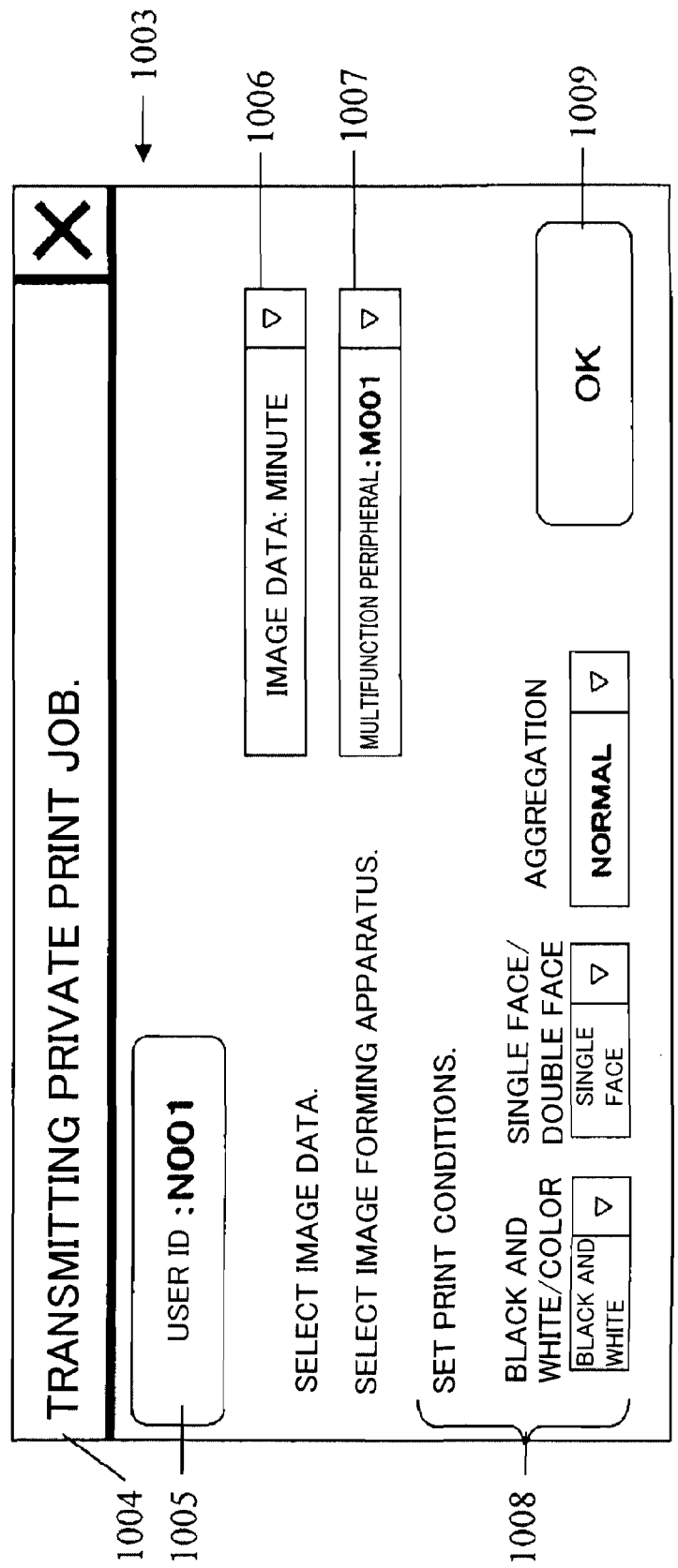
FIG. 10B is an illustration of one example of a job transmission screen 1003 that is displayed on a display of a first terminal device 120C1 according to the first embodiment of the present invention.

FIG. 10B is an illustration of one example of a job transmission screen 1003 that is displayed on a display of the first terminal device 120C1 according to the first embodiment of the present invention.

As shown in FIG. 10B, the job transmission screen 1003 presents a message 1004 notifying of transmission of a print request along with a private print instruction, a user ID "N001" 1005 that is logged in, a first pull-down menu 1006 that selectably displays an image name corresponding to the image data, a second pull-down menu 1007 that selectably displays a device name corresponding to the device identification information, print conditions (output conditions) 1008 that is to be set as the private print job, and an "OK" key 1009 for transmitting the request for the private print job. It should be noted that, as the output conditions, default conditions that are previously set are first displayed.

The first user selects a predetermined image name (e.g., "minute") as a target of the private print job from the first pull-down menu 1006 and a predetermined device name (e.g., "Multifunction Peripheral M001") with which it is desired to execute the private print job from the second pull-down menu 1007 while looking at the job transmission screen 1003, and selects the "OK" key 1009. With this, the request means 506 generates job data of a print request based on the image data relating to a selected image name "minute" and the default condition. Furthermore, the request means 506 specifies the second communication means 509 of the multifunction peripheral 100 corresponding to the selected device name "Multifunction Peripheral M001" (identification information of the image forming apparatus) via the first communication means 508, and transmits the job data, the originating user ID "N001" (originating user ID), and the print request accompanied by the private print instruction to the specified second communication means 509 (Step S105 in FIG. 6).

Upon receipt of the job data, the originating user ID, and the print request (Step S106 in FIG. 6), the second communication means 509 of the multifunction peripheral 100 notifies a list transmission means 510 of the reception. The list transmission means 510 that has received the notification judges whether or not the print request is accompanied by the private print instruction (Step S107 in FIG. 6).

As a result of the judgment, if the print request is not accompanied by the private print instruction (NO in Step S107 in FIG. 6), the list transmission means 510 notifies the print job execution means 519 of the result of the judgment. Upon receipt of the notification, the print job execution means 519 executes image formation based on the job data described above (Step S140 in FIG. 8C). This corresponds to a normal print process.

On the other hand, as a result of the judgment, if the print request is accompanied by the private print instruction (YES in Step S107 in FIG. 6), the list transmission means 510 searches for a handling user to handle the execution of the private print (Step S108 in FIG. 6). As used herein, the handling user represents a user who is logging in a terminal device that is connected to the network and different from the first terminal device 120C1 at the point in time when the list transmission means 510 receives the print request, and who is able to execute the private print.

Although the method by which the list transmission means 510 searches for the handling user may be any method, one example is described below. Specifically, the list transmission means 510 communicates with the different terminal device connected to the network 120F via the second communication means 509, and detects whether or not the authenticating means provided to the different terminal device has allowed the user to log in.

If the authenticating means has allowed the user to log in, the list transmission means 510 acquires the user ID (candidate handling user ID) of the user from the authenticating means.

On the other hand, if the authenticating means has not allowed the user to log in, the list transmission means 510 communicates with a terminal device different from the detected terminal device, and detects whether or not the authenticating means of this device has allowed the user to log in.

In this case, for example, if there is a specified terminal device (server) that manages the network 120F to which the plurality of terminal devices 120C are connected, it is possible to employ a method in which the list transmission means 510 communicates with the server and searches for a user recognized by the server as being logging in as candidate handling users.

Upon acquisition of the candidate handling user ID, the list transmission means 510 refers to an authentication information table that is used when executing the private print and is recorded in advance in the authentication information record means 511, and judges whether or not the candidate handling user ID matches a user ID recorded in the authenticate information table (comparison user ID). In the authentication information table, a table identical to the use permission table 1000 shown in FIG. 10A is recorded.

If the candidate handling user ID matches the comparison user ID, the list transmission means 510 determines the matched candidate handling user ID to be the user ID of the handling user (handling user ID). If the candidate handling user ID does not match the comparison user ID, the list transmission means 510 erases the candidate handling user ID that does not match. In this manner, the list transmission means 510 searches for a handling user. Then, the list transmission means 510 creates a handling user list based on handling user IDs that have been searched.

Upon completion of the search for the handling user, the list transmission means 510 transmits the handling user list, which is created to select the specified handling user out of the handling users based on the searched (acquired) handling user IDs, and notification (reception notification) that the private print has been accepted to the request means 506 of the first terminal device 120C1 (Step S109 in FIG. 6).

Upon receipt of the handling user list and the reception notification (Step S110 in FIG. 6), the request means 506 notifies the selection means 520 of the reception. Then, the selection means 520 that has received the notification causes the first display means 502 to display a handling user selection screen (Step S111 in FIG. 6).

FIG. 10C is an illustration of one example a handling user selection screen 1100 that is displayed on the display of the first terminal device 120C1 according to the first embodiment of the present invention.

As shown in FIG. 10C, the handling user selection screen 1100 presents a message 1101 notifying of the acceptance of the private print, an originating user ID "N001" 1102, an image name "minute" 1103 as a print target, a "private print" key 1104 for making the printing to be a normal private print, a message 1105 prompting the user to make (transfer) the execution of the private print to be handled by the handling user, a third pull-down menu 1106 that selectably displays the handling user ID, and a "request" key 1107 for making a request for handling the execution of the private print to the terminal device of the handling user ID.

It should be noted that, in a case in which the list transmission means 510 fails to determine the handling user ID, that is, if there is no handling user at the point in time when the list transmission means 510 receives the print request, the message 1105, the third pull-down menu 1106, and the "request" key 1107 are not displayed.

Now, in a case in which the first user requests the handling user to handle the execution of the private print, the first user selects a specified handling user ID (second user ID "N002") from the third pull-down menu 1106 while looking at the handling user selection screen 1100, and further selects the "request" key 1107. With this, the selection means 520 accepts an instruction for requesting the handling (YES in Step S112 in FIG. 6), and transmits the second user ID "N002" and handling user requesting notification to the inquiry means 512 (via the first communication means 508 and the second communication means 509) (Step S113 in FIG. 6).

Upon receipt of the second user ID "N002" and the handling user requesting notification (Step S114 in FIG. 6), the inquiry means 512 acquires the first user ID "N001" (originating user ID) and the image name "minute" from the list transmission means 510, and also specifies a third communication means 513 of the second terminal device 120C2 (request target terminal device) to which the second user is logging in based on the second user ID "N002". Then, the inquiry means 512 transmits the first user ID "N001", the image name "minute", and notification for inquiring whether or not to agree to the handling of the execution of the private print (handling agreement/refusal notification) (via the second communication means 509) to the third communication means 513 (Step S115 in FIG. 6).

In this case, as the inquiry means 512 transmits the image name "minute" to the third communication means 513 (response means 514) in place of the job data including the image data, it is possible for the multifunction peripheral 100 to allow the second user to identify the target of execution of the private print, to prevent communication traffic from increasing, and to prevent a person attempting to illegitimately acquire confidential data via the network from illegitimately acquiring the job data. It should be noted that, according to the first embodiment of the present invention, as the communication (transmission and reception) between the first terminal device 120C1, the second terminal device 120C2, and the multifunction peripheral 100 is carried out with the predetermined identification information (e.g., such as the user ID and the image name "minute"), instead of the job data once transmitted to the multifunction peripheral 100, the multifunction peripheral 100 and the image forming system can provided the above described advantageous effect.

Upon receipt of the first user ID "N001", the image name "minute", and the handling agreement/refusal notification (Step S116 in FIG. 6), the third communication means 513 notifies the response means 514 of the reception. The response means 514 that has received the notification causes the second display means 515 to display a handling agreement/refusal selection screen (Step S117 in FIG. 7).

FIG. 10D is an illustration of one example of a handling agreement/refusal selection screen 1108 that is displayed on a display of the second terminal device 120C2 according to the first embodiment of the present invention.

As shown in FIG. 10D, the handling agreement/refusal selection screen 1108 presents a message 1109 notifying of the reception of the request for the handling of the execution of the private print, an originating (request source) user ID (first user ID "N001") 1110 of the private print, an image name "minute" 1111 as a print target, a message 1112 prompting the user to agree or refuse to the handling of the execution of the private print, an "OK" key 1113 for agreeing to the handling, and an "NG" key 1114 for refusing to the handling in a pop-up manner.

In this case, the procedure in a case in which the second user agrees to the handling of the execution of the private print is carried out as described below. Specifically, when the second user selects the "OK" key 1113 via an input means that is not illustrated while looking at the handling agreement/refusal selection screen 1108, the response means 514 receives an instruction for agreeing to the handling (YES in Step S118 in FIG. 7), and transmits handling agreement notification to the inquiry means 512 (via the third communication means 513 and the second communication means 509) (Step S119 in FIG. 7).

Upon receipt of the handling agreement notification (Step S120 in FIG. 7), the inquiry means 512 determines that the handling of the execution of the private print requested to the handling user is agreed to, and records the handling user ID (second user ID "N002") and the job data for the print request in association with each other in a lowermost line in a job table previously recorded in the job recording means 516 (Step S121 in FIG. 6).

FIG. 10E1 is an illustration of one example of a job table 1200 according to the first embodiment of the present invention.

As shown in FIG. 10E1, the job table 1200 records a user ID 1201 and job data 1202 for the private print job in association with each other. The inquiry means 512 described above records the handling user ID (second user ID "N002") in place of the originating user ID (first user ID "N001") in the job table 1200. Along with this, the inquiry means 512 also records the job data (job data relating to the image name "minute") in the job table 1200 associating with the handling user ID. With this, the private print job by the first user of the originating user ID is transferred to the second user of the handling user ID. In this case, it is possible to prepare a storage area for recording the job data in the job table for each user ID, for example. The storage area prepared for each user ID corresponds to a private box for each user ID.

Now, after recording the second user ID "N002" and the job data in association with each other in the job table 1200, the inquiry means 512 transmits notification that the handling of the execution of the private print is agreed (agreement notification) to the selection means 520 of the first terminal device 120C1 in which the first user is logged in (via the second communication means 509 and the first communication means 508) (Step S122 in FIG. 7).

Upon receipt of the agreement notification (S123 in FIG. 7), the selection means 520 causes the first display means 502 to display a handling agreement screen (Step S124 in FIG. 7).

Figure 10F:
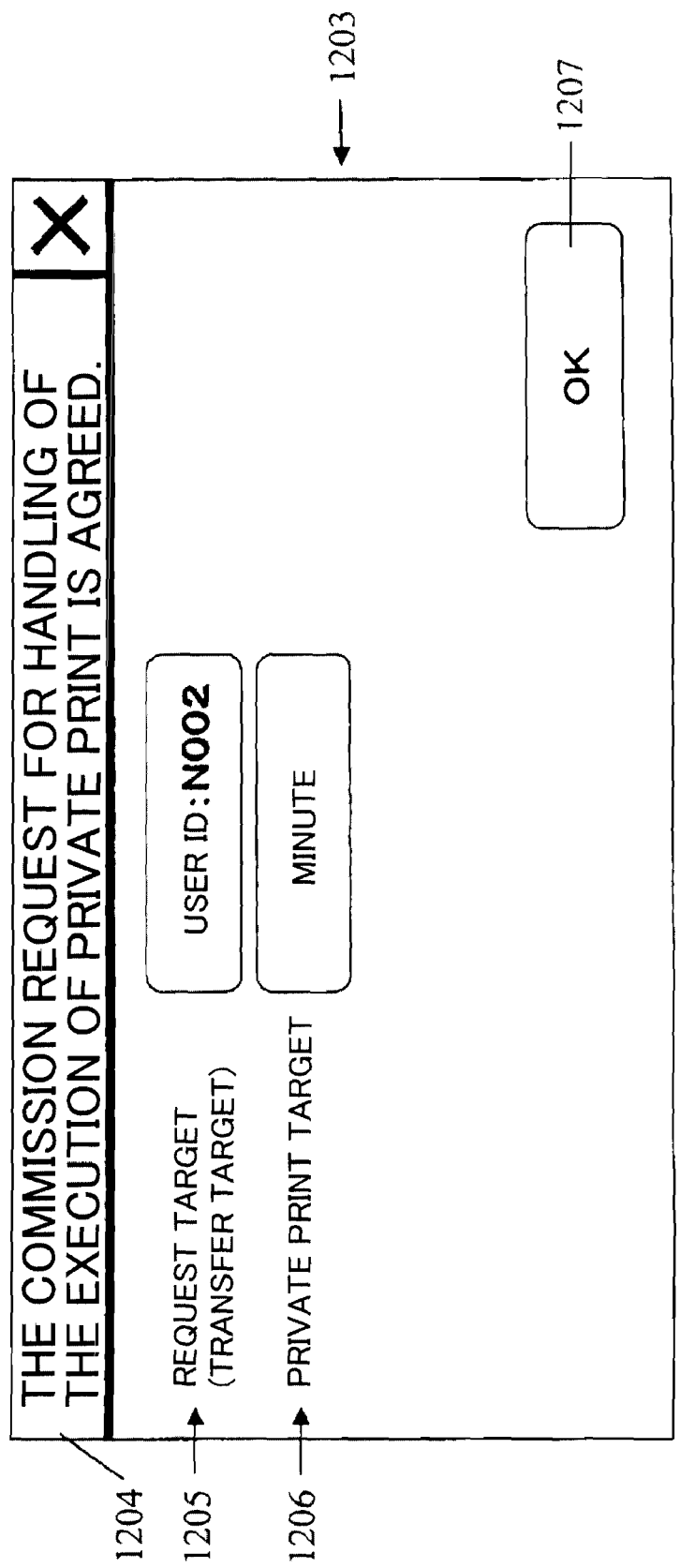
FIG. 10F is an illustration of one example of a handling agreement screen 1203 that is displayed on the display of the first terminal device 120C1 according to the first embodiment of the present invention.

FIG. 10F is an illustration of one example of a handling agreement screen 1203 that is displayed on the display of the first terminal device 120C1 according to the first embodiment of the present invention.

As shown in FIG. 10F, the handling agreement screen 1203 presents a message 1204 notifying that the handling of the execution of the private print is agreed to, the agreeing handling user ID (second user ID "N002") 1205, the image name "minute" 1206, and an "OK" key 1207 for closing the handling agreement screen 1203.

When the first user presses the "OK" key 1207 while looking at the handling agreement screen 1203, for example, the selection means 520 erases the handling agreement screen 1203 from the first display means 502. Furthermore, when the first user selects a log-out key that is previously provided for disabling the user authentication (log out), the authenticating means 501 causes the first user to log out (Step S125 in FIG. 7), and the procedure in the first terminal device 120C1 is terminated.

Moreover, upon transmission of the agreement notification to the selection means 520, the inquiry means 512 subsequently acquires the device identification information of its own ("Multifunction Peripheral M001") from predetermined memory, and transmits notification that the printing is executed by the multifunction peripheral 100 identified the device identification information (execution notification) to the response means 514 of the second terminal device 120C2 in which the second user is logged in (Step S126 in FIG. 7). With this, the acceptance of the private print job in the multifunction peripheral 100 is completed.

Upon receipt of the execution notification (Step S127 in FIG. 7), the response means 514 causes the second display means 515 to display a print execution screen (Step S128 in FIG. 7).

Figure 10G:
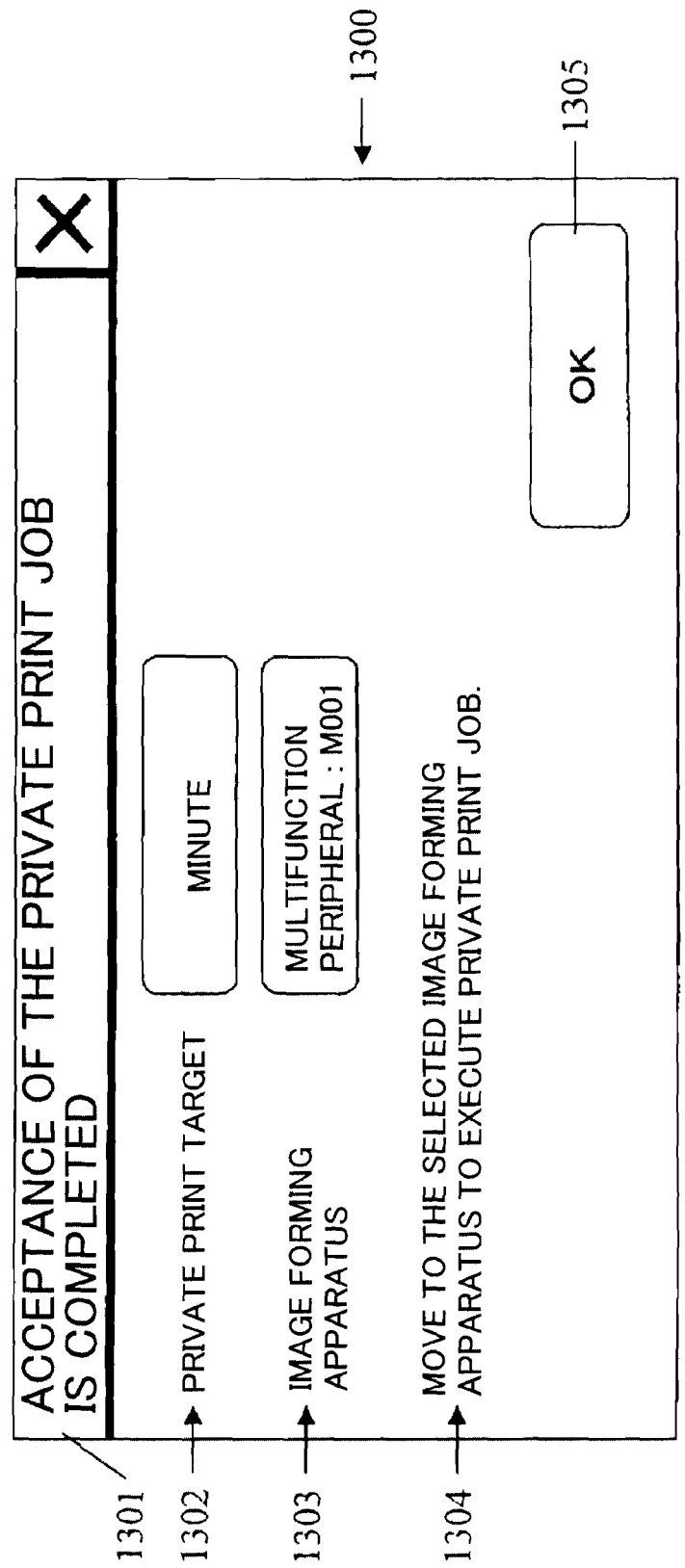
FIG. 10G is an illustration of one example of a print execution screen 1300 that is displayed on the display of the second terminal device 120C2 according to the first embodiment of the present invention.

FIG. 10G is an illustration of one example of a print execution screen 1300 that is displayed on the display of the second terminal device 120C2 according to the first embodiment of the present invention.

As shown in FIG. 10G, the print execution screen 1300 presents a message 1301 notifying the completion of the acceptance of the private print job, an image name "minute" 1302, a device name "Multifunction Peripheral M001" 1303 corresponding to the device identification information and having accepted the private print job, a message 1304 indicating the method of executing the private print, and an "OK" key 1305 for closing the job execution screen.

When the second user presses the "OK" key 1305 while looking at the print execution screen 1300, for example, the response means 514 erases the print execution screen 1300 from the second display means 515. Furthermore, when the second user selects the log-out key, the authenticating means of the second terminal device 120C2 that is not illustrated causes the second user to log out (Step S129 in FIG. 7), and the procedure in the second terminal device 120C2 is terminated. Thereafter, the second user moves to the multifunction peripheral 100 (described later).

On the other hand, a procedure in a case in which the second user refuses to the handling of the execution of the private print in Step S118 is carried out as described below. Specifically, when the second user selects the "NG" key 1114 while looking at the handling agreement/refusal selection screen 1108, the response means 514 receives an instruction for refusing to the handling (NO in Step S119 in FIG. 6), and transmits handling refusal notification to the inquiry means 512 (Step S130 in FIG. 8A). When refusing, the procedure in the second terminal device 120C2 is terminated here.

Upon receipt of the handling refusal notification (Step S131 in FIG. 8A), the inquiry means 512 determines that the handling user has refused to the handling of the execution of the private print requested to the handling user. The inquiry means 512 deletes the ID (second user ID "N002") of the refusing handling user from the handling user list (Step S132 in FIG. 8A), and transmits the handling user list after the deletion as the next handling user list to the list transmission means 510. Furthermore, the inquiry means 512 instructs the list transmission means 510 to further transmit the next handling user list to the first communication means 508.

Then, the process returns to the above described Step S109, and the list transmission means 510 transmits the next handling user list to the selection means 520 of the first terminal device 120C1 (Step S109 in FIG. 6). As the procedure in this case is similar to that in Step S110, an explanation is omitted.

It should be noted that the selection means 520 that has received the next handling user list (Step S110 in FIG. 6) causes the first display means 502 to display a job transfer refusal screen including a message notifying of the refusal as described below, for example (Step S111 in FIG. 6).

Figure 10H:
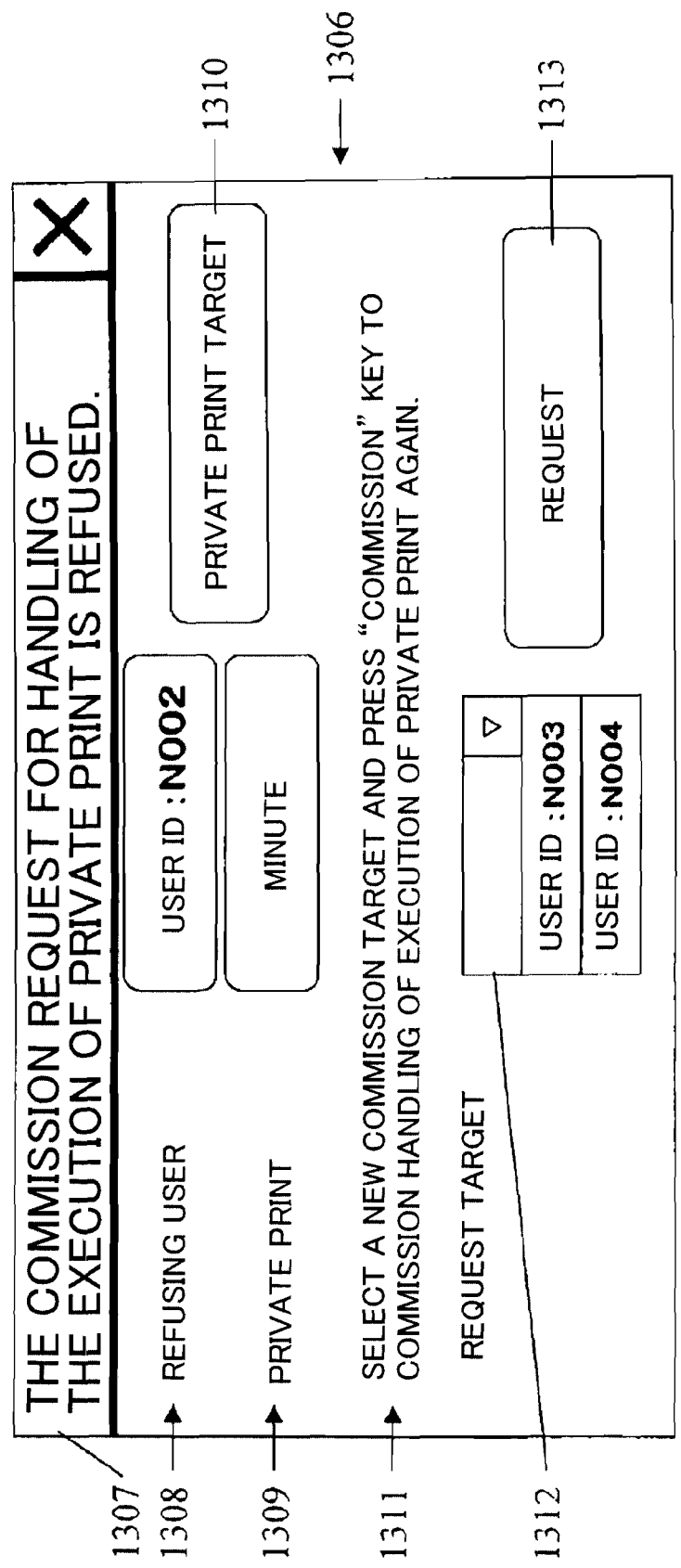
FIG. 10H is an illustration of one example of a job transfer refusal screen 1306 that is displayed on the display of the first terminal device 120C1 according to the first embodiment of the present invention.

FIG. 10H is an illustration of one example of a job transfer refusal screen 1306 that is displayed on the display of the first terminal device 120C1 according to the first embodiment of the present invention, indicating the refusal.

As shown in FIG. 10H, the job transfer refusal screen 1306 indicating the refusal presents a message 1307 notifying of the refusal to the handling of the execution of the private print, a refusing user ID (second user ID "N002") 1308 as a target of the request, an image name "minute" 1309, a "private print" key 1310, a message 1311 prompting the user to let a handling user other than the refusing handling user to handle the execution of the private print, a fourth pull-down menu 1312 that selectably displays the handling user ID based on the next handling user list, and a "request" key 1313. It should be noted that, when there is no handling user ID in the next handling user list, the message 1311, the fourth pull-down menu 1312, and the "request" key 1313 are not displayed in the job transfer refusal screen 1306. With this, the first user is able to request the handling of the execution of the private print again to a handling user different from the second user who has refused to the request of the handling, or to execute the private print on the first user's own.

On the other hand, in a case in which the first user executes the private print on the user's own in Step S112 without requesting the handling of the execution of the private print to a user other than the second user, i.e. when the normal private print is executed, the procedure is as described below.

Specifically, upon the first user pressing a "private print" key 1310 displayed in the job transfer refusal screen 1306, the selection means 520 accepts an instruction for the normal private print (NO in Step S112 in FIG. 6), and transmits notification for the private print job (normal notification) to the inquiry means 512 (Step S133 in FIG. 8B).

Upon receipt of the normal notification (Step S134 in FIG. 8B), the inquiry means 512 records a user ID as a transmission destination (first user ID "N001") and the job data of the private print job in association with each other in a lowermost line in the job table in the job recording means 516 (Step S135 in FIG. 8B). FIG. 10E2 shows one example of the job table in this case. With this, as can be seen from comparison with FIG. 10E1, a first user ID "N001" 1210 is recorded as the user ID in a job table 1208 in FIG. 10E2, in place of the second user ID "N002" 1209. This means that the first user has transmitted the request for the private print job.

Next, the inquiry means 512 transmits the execution notification to the selection means 520 (Step S136 in FIG. 8B). With this, the acceptance of the private print job in the multifunction peripheral 100 is completed.

Upon receipt of the execution notification (Step S137 in FIG. 8B), the selection means 520 causes the first display means 502 to display the print execution screen 1300 of FIG. 10G (Step S138 in FIG. 8B). For example, by the first user selecting the predetermined log-out key after selecting the "OK" key 1305, the authenticating means 501 logs out the first user (Step S139 in FIG. 8B). With this, the procedure in the first terminal device 120C1 is terminated. In this case, the first user moves to the multifunction peripheral 100.

Execution of Private Print Job

Now, when the user who has pressed the "OK" key 1305 on the print execution screen 1300 in FIG. 10G (e.g., second user) moves to the multifunction peripheral 100 and touches the touch screen 301 of the operating unit 103 of the multifunction peripheral 100, the display accepting means 517 of the multifunction peripheral 100 senses the user touching the touch screen 301, and displays an initial copy screen relating to the copy setting on the touch screen 301 (Step S201 in FIG. 9).

Figure 10I:
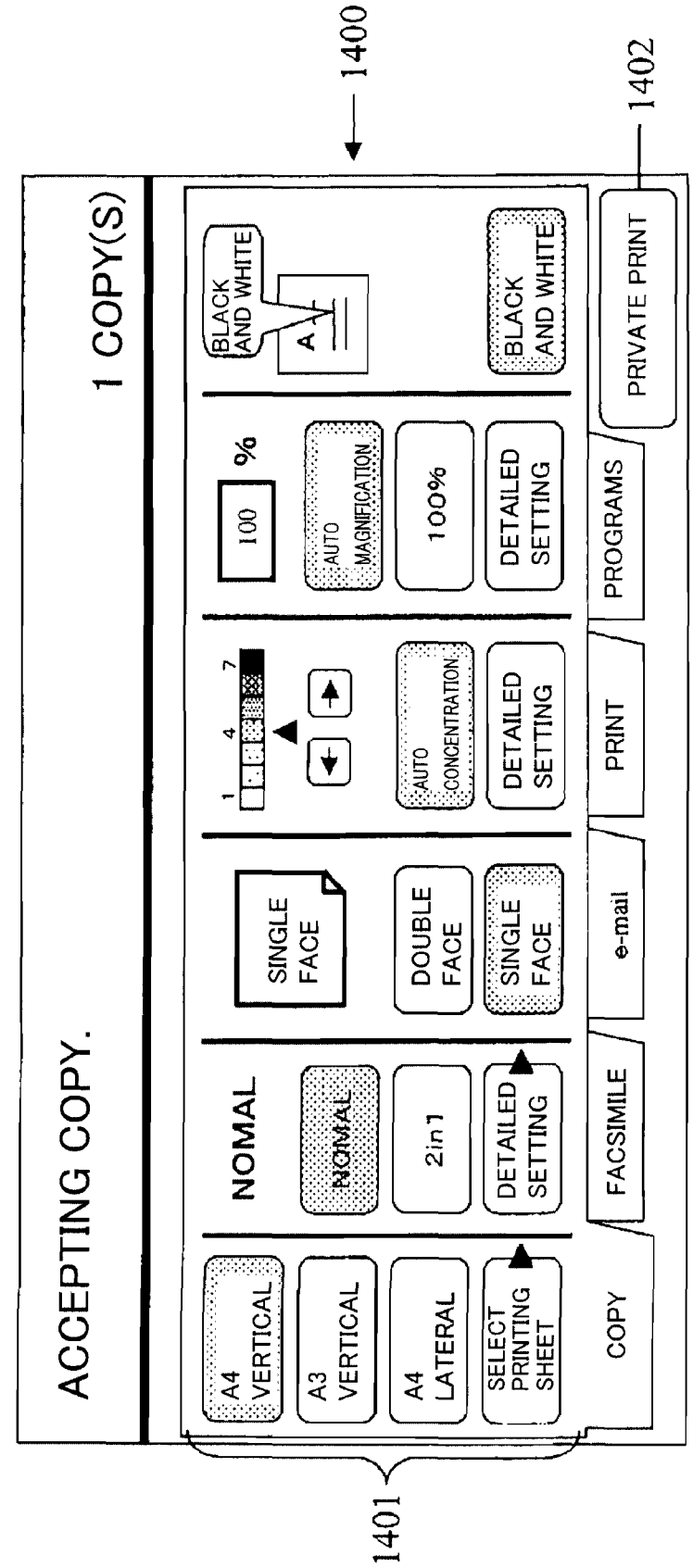
FIG. 10I is an illustration of one example of an initial copy screen 1400 that is displayed on a touch screen according to the first embodiment of the present invention.

FIG. 10I is an illustration of one example of an initial copy screen 1400 that is displayed on a touch screen according to the first embodiment of the present invention.

As shown in FIG. 10I, the initial copy screen 1400 presents a "private print" key 1402 for shifting to a private print execution mode in addition to normal setting keys 1401 for setting the copying conditions.

When the second user presses the "private print" key 1402 while looking at the initial copy screen 1400, the display accepting means 517 accepts the request for executing the private print job, and notifies private print accepting means 518 of the acceptance (Step S202 in FIG. 9). The private print accepting means 518 that has received the notification causes an authentication information input screen to be displayed on the touch screen 301, and accepts an input of the user ID and password from the second user (Step S203 in FIG. 9).

Figure 10J:
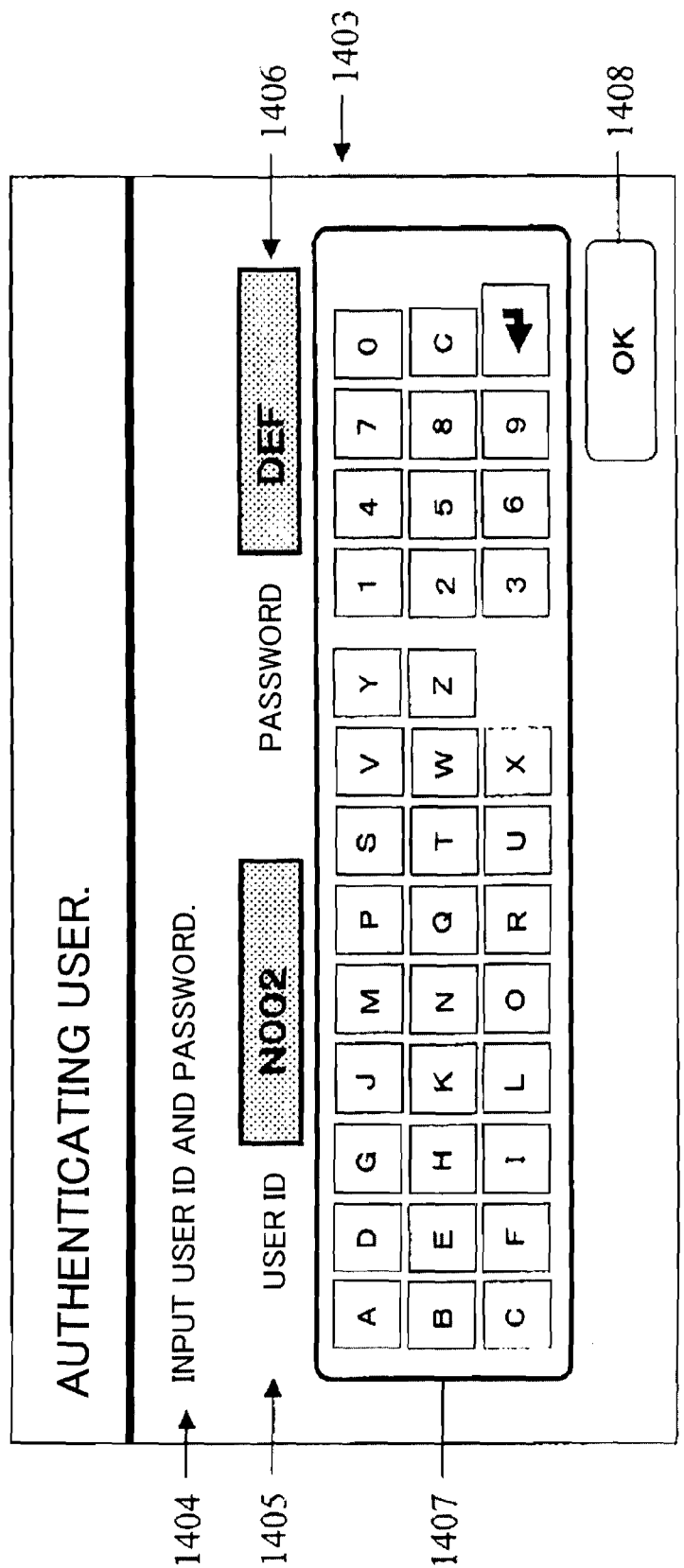
FIG. 10J is an illustration of one example of an authentication information input screen 1403 that is displayed on the touch screen according to the first embodiment of the present invention.

FIG. 10J is an illustration of one example of an authentication information input screen 1403 that is displayed on the touch screen according to the first embodiment of the present invention.

As shown in FIG. 10J, the authentication information input screen 1403 presents a message 1404 prompting the user to input the user ID and the password, a user ID input field 1405 in which the user ID can be inputted, a password input field 1406 in which the password can be inputted, keyboard keys 1407 with which the user ID and the password are inputted, and an "OK" key 1408.

The second user, using the keyboard keys 1407 while looking at the authentication information input screen 1403, inputs the user ID "N002" of the user's own into the user ID input field 1405, and inputs a password "DEF" of the user's own into the password input field 1406, and presses the "OK" key 1408. With this, the private print accepting means 518 accepts the user ID (inputted second user ID) and the password (inputted second password) that have been inputted, and authenticates the second user based on the inputted second user ID and the inputted second password and (information of) the authentication information table recorded in the authentication information record means 511 (Step S204 in FIG. 9).

The private print accepting means 518 judges whether or not the inputted second user ID matches the user ID (comparison user ID) recorded in the authentication information table. Subsequently, if matching, the private print accepting means 518 further judges whether or not the inputted second password matches the comparison password that corresponds to the authentication information table that have matched the inputted second user ID.

Then, as a result of the judgment, if the inputted second user ID does not match the comparison user ID, or if the inputted second password does not match the comparison password (NO in Step S204 in FIG. 9), the private print accepting means 518 erases the inputted second user ID and the inputted second password, and terminates the execution of the private print job. With this, only the user who has transmitted the private print job or the user who has agreed to the transfer of the private print job can execute the private print job, and the confidentiality of the printed matter printed by the private print job is guaranteed. When the execution of the private print job is terminated, the display accepting means 517 displays the initial copy screen 1400 on the touch screen 301, for example.

On the other hand, if it has been judged that the inputted second user ID matches the comparison user ID and the inputted second password matches the comparison password (YES in Step S204 in FIG. 9), the private print accepting means 518 allows the second user to log in (log in success), refers to the job table of the job recording means 516, and acquires the job data associated with the user ID that match the user ID "N002" of the second user who has logged in.

In this case, as shown in FIG. 10E1, in a case in which there are job data 1211 of the image name "minute" that has transferred from the first user earlier and the job data 1212 of an image name "report" when the second user executed a request of a prior private print job, the private print accepting means 518 acquires all job data (both of the job data 1211 and 1212) that corresponds to the user ID "N002" as the job data corresponding to the user ID "N002".

The private print accepting means 518 that has acquired the job data causes a private print execution screen based on the job data to be displayed on the touch screen (Step S205 in FIG. 9).

Figure 10K:
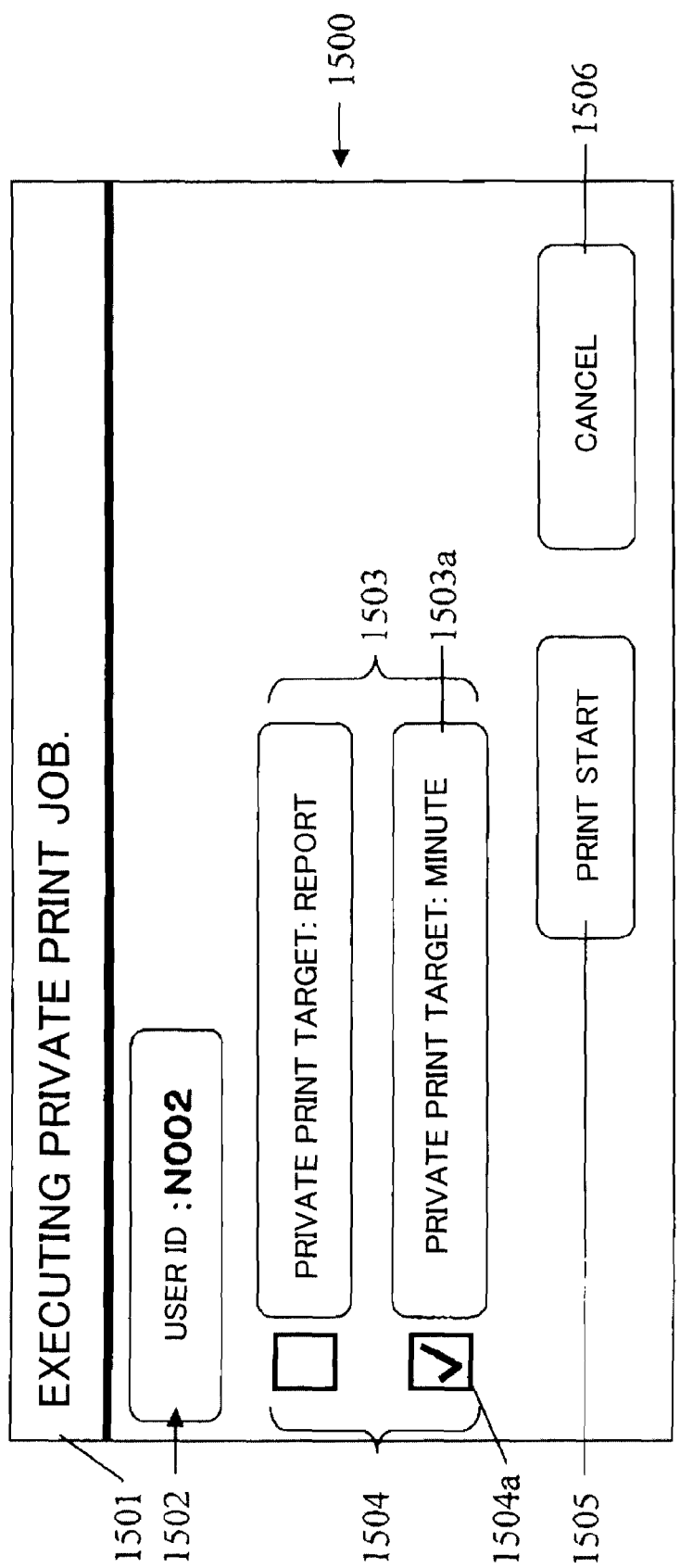
FIG. 10K is an illustration of one example of a private print execution screen 1500 that is displayed on the touch screen according to the first embodiment of the present invention.

FIG. 10K is an illustration of one example of a private print execution screen 1500 that is displayed on the touch screen according to the first embodiment of the present invention.

As shown in FIG. 10K, the private print execution screen 1500 presents a message 1501 prompting the user to execute the private print job, the user ID "N002" 1502 of the second user who is logged in the multifunction peripheral 100, image names 1503 corresponding to the acquired job data, check boxes 1504 provided for the respective image names 1503 with which one of the image names is selectable, a "print start" key 1505 for executing the private print job, and a "cancel" key 1506 for canceling the execution of the private print job.

While looking at the private print execution screen 1500, the second user selects a check box 1504a corresponding to an image name "minute" 1503a to enable the check box 1504a, and then presses the "print start" key 1505. With this, the private print accepting means 518 accepts the selection of the job data corresponding to the image name "minute" 1503a and the pressing of the "print start" key 1505 (YES in Step S206 in FIG. 9), and notifies the print job execution means 519 of this acceptance. The print job execution means 519 that has received the notification reads the job data corresponding to the selected image name "minute" 1503a from the job table 1200, and executes the image formation based on the read job data (Step S207 in FIG. 9). This allows the second user who has agreed to the transfer request to cause the multifunction peripheral 100 to execute the private print job in place of the first user as the transmission source of the private print job. Furthermore, since the second user uses the user ID and the password of the second user to cause the multifunction peripheral 100 to execute the private print job, the first user as the transmission source is not required to inform the second user of the user ID and the password of the first user. This is exceptionally preferable in terms of security.

Now, upon completion of the execution of the image formation based on the job data, the print job execution means 519 erases the job data whose image has been formed from the job table (Step S208 in FIG. 9). With this, the print job execution means 519 terminates the execution of the private print job.

On the other hand, when the second user presses the "cancel" key 1506 while looking at the private print execution screen 1500, the private print accepting means 518 receives the acceptance of the pressing of the "cancel" key 1506 (NO in Step S206 in FIG. 9), and terminates the execution of the private print job. In this case, the user ID "N002" and the job data of the image name "minute" remain recorded in the job table 1200 in association with each other. It should be noted that, while the procedure of the execution of the private print job is described relating to the second user, this also applies to the first user; therefore, an explanation thereof is omitted.

As described above, the multifunction peripheral 100 according to the first embodiment of the present invention is connected with the plurality of the terminal devices 120C via the network 120F, and is provided with: the list transmission means 510 that transmits the handling user list for allowing the first terminal device 120C1 to select the handling user to handle the execution of the private print to the first terminal device 120C1 when there is a print request accompanied by a private print instruction from the first terminal device 120C1; the inquiry means 512 that inquires, when the specified handling user is selected by the first terminal device 120C1, to the second terminal device 120C2 that the selected handling user uses, as to whether or not to agree to the handling of the execution of the private print; and the job recording means 516 that records, when the handling of the execution of the private print is agreed to by the second terminal device 120C2, the user ID for identifying the handling user using the second terminal device 120C2 and the job data of the print request in association with each other.

According to this configuration, without informing (telling) the handling user who has agreed to the handling of the execution of the private print of the user ID, the password of the first user, etc., the user who has transmitted the private print instruction is able to allow the handling user to execute the private print. With this, the multifunction peripheral 100 improves the user-friendliness of the private print function, and improves the security of the confidentiality of the printed matter.

Second Embodiment

Figure 10L:
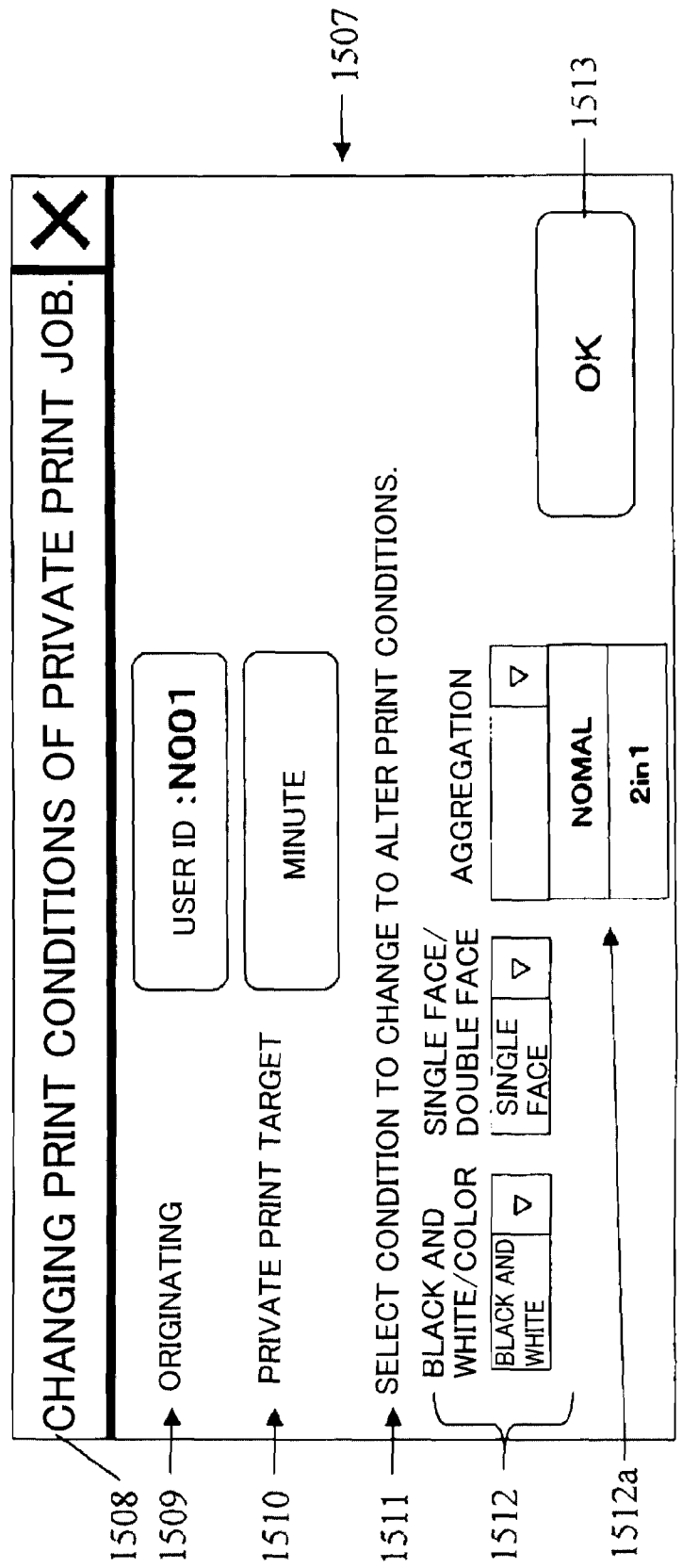
FIG. 10L is an illustration of one example of a print condition alteration screen 1507 that is displayed on a display of a second terminal device 120C2 according to a second embodiment of the present invention.
Figure 11:
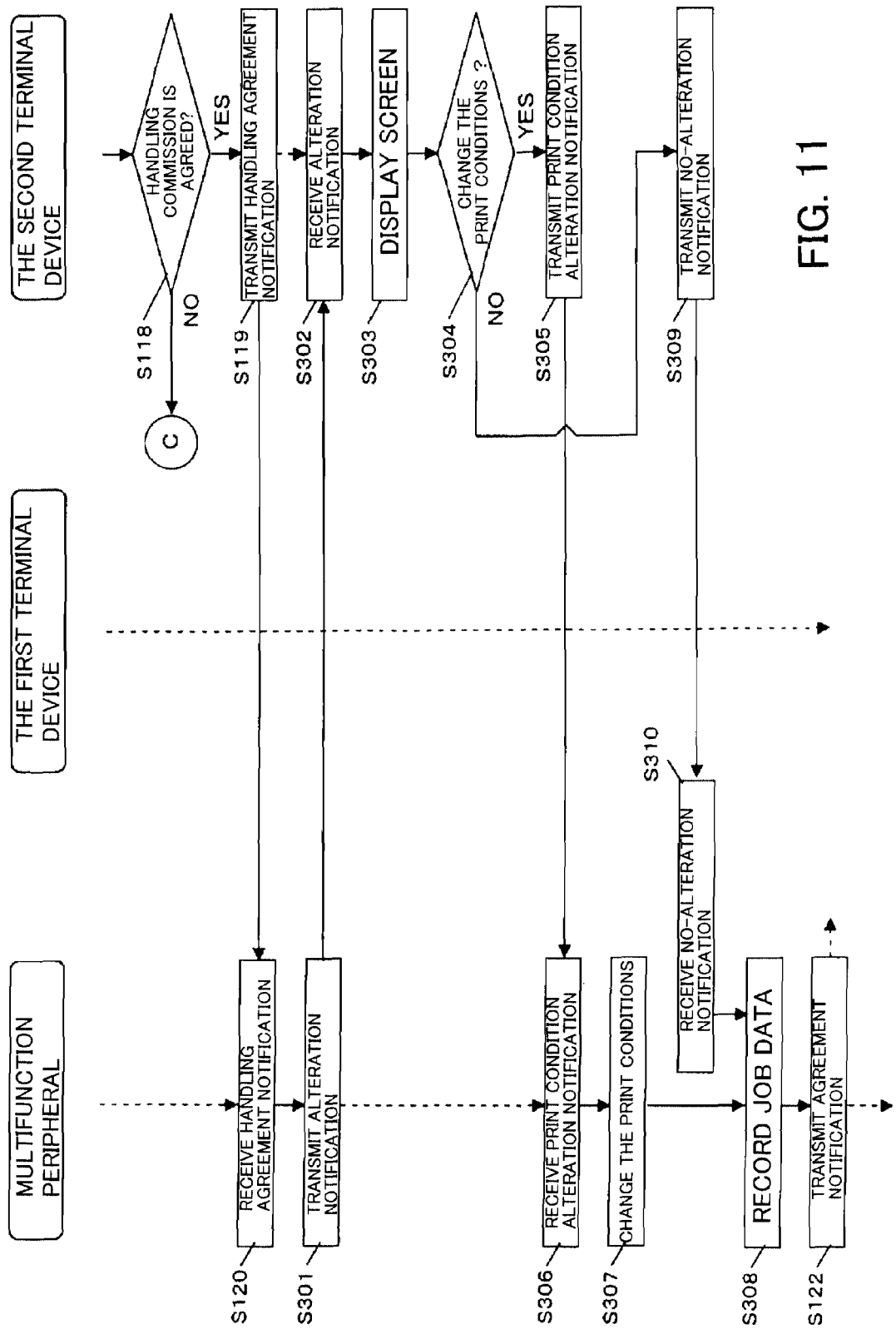
FIG. 11 is a flowchart of a procedure for accepting a private print job according to the second embodiment of the present invention.

The following describes a procedure according to which a multifunction peripheral 100 and a terminal device 120C according to a second embodiment easily allows a different user to execute their own job relating to private print, with reference to FIG. 10L and FIG. 11. The second embodiment is different from the first embodiment in that, when a second terminal device agrees to the handling of the execution of the private print, the inquiry means 512 inquires to the second terminal device whether or not to change an output condition corresponding to the job data of the print request, and in that, when the output condition is changed, the job recording means 516 records identification information for identifying the handling user who uses the second terminal device and the job data corresponding to the altered output condition in association with each other. Other than this point, the second embodiment is the same as the first embodiment, and the second embodiment is described also with reference to the drawings that are referred to in the description of the first embodiment (FIGS. 1 to 10K) accordingly. FIG. 10L is an illustration of one example of a print condition alteration screen 1507 that is displayed on a display of a second terminal device 120C2 according to the second embodiment of the present invention. FIG. 11 is a flowchart of a procedure for accepting a private print job according to the second embodiment of the present invention.

Now, in a case in which the second user agrees to the handling of the execution of the private print in Step S118 in FIG. 7 (corresponding to Step S118 in FIG. 11), when the second user selects the "OK" key 1113 while looking at the handling agreement/refuse selection screen 1108 shown in FIG. 10D, the response means 514 receives an instruction for agreeing to the handling (YES in S118 in FIG. 11), and transmits handling agreement notification to the inquiry means 512 (Step S119 in FIG. 11).

Upon receipt of the handling agreement notification (Step S120 in FIG. 11), the inquiry means 512 determines that the handling user has agreed to the handling of the execution of the private print requested to the handling user, and acquires print conditions from the job data of the print request (e.g., the default conditions corresponding to "black and white" color, "single face" printing, and "NORMAL" aggregation), and transmits the acquired print conditions and notification regarding whether or not to change the print conditions (alteration notification) to the response means 514 (Step S301 in FIG. 11).

In this case, since the inquiry means 512 transmits the print conditions to the response means 514 in place of the job data including the image data, it is possible for the multifunction peripheral 100 to allow the second user to identify the target of execution of the private print, to prevent communication traffic from increasing, and to prevent a person attempting to illegitimately acquire confidential data via the network from illegitimately acquiring the job data.

Upon receipt of the print condition and the alteration notification (Step S302 in FIG. 11), the response means 514 causes the second display means 515 to display the print condition alteration screen (Step S303 in FIG. 11).

FIG. 10L is an illustration of one example of the print condition alteration screen 1507 that is displayed on the display of the second terminal device 120C2 according to the second embodiment of the present invention.

As shown in FIG. 10L, the print condition alteration screen 1507 presents a message 1508 for accepting an alteration or no alteration of the print conditions of the private print job, an originating user ID "N001" 1509, an image name "minute" 1510, a message 1511 prompting the handling user (second user) who handles the execution of the private print to change the print conditions, print conditions 1512 that changeably (selectably) display each item corresponding to print conditions in a pull-down menu, and an "OK" key 1513 for setting the print conditions. In this case, as the print conditions 1512, the default conditions previously described are first displayed as an initial display.

Here, for example, if the second user wishes to change an aggregation condition out of the print conditions corresponding to the job data from "NORMAL" to "2-in-1" in order to save the printing sheets or due to a previously set print execution restriction (department management restriction), and the second user selects "2-in-1" from a pull-down menu 1512a as the aggregation condition and selects the "OK" key 1513, the response means 514 compares the print conditions in the print request of the job data at a time when the print request was made (default condition) with the print conditions at a time when the "OK" key 1513 was accepted (the print conditions in which the aggregation condition is changed to "2-in-1"). If it has been judged that the two conditions do not match, the response means 514 accepts an instruction for changing the aggregation condition from "NORMAL" to "2-in-1" (YES in Step S304 in FIG. 11), and transmits a print condition alteration notification to the inquiry means 512 (Step S305 in FIG. 11).

Upon receipt of the print condition alteration notification (Step S306 in FIG. 11), the inquiry means 512 changes the print conditions from the print conditions in the print request of the job data at the time when the print request was made (default condition) to the altered print conditions (in which the aggregation condition is "2-in-1") (Step S307 in FIG. 11), and records the handling user ID (second user ID "N002") and the job data corresponding to the altered print conditions in a lowermost line of the job table of the job recording means 516 in association with each other (FIG. 11:308). The subsequent procedure is the same as that in Step S122 in FIG. 7 (corresponds to Step S122 in FIG. 11) described in the first embodiment; therefore, an explanation thereof is omitted.

On the other hand, if the second user selects the "OK" key 1513 without changing the print conditions, the response means 514 judges that the print conditions at the time when the print request was made match the print conditions at the time when the "OK" key was accepted, accepts an instruction for not changing the print conditions (NO in Step S304 in FIG. 11), and transmits a no-alteration notification to the inquiry means 512 (Step S309 in FIG. 11).

Upon reception of the no-alteration notification (Step S310 in FIG. 11), the inquiry means 512 records the handling user ID (second user ID "N002") and the job data corresponding to the print conditions at the time when the print request was made (unchanged print conditions) in a lowermost line of the job table of the job recording means 516 in association with each other (Step S308 in FIG. 11). The subsequent procedure is the same as that in Step S122 in FIG. 7 (corresponds to Step S122 in FIG. 11) described in the first embodiment; therefore, an explanation thereof is omitted.

This allows the second user who has agreed to the handling of the execution of the private print to execute the private print based on the print conditions that the second user desires. In particular, if the print conditions of the private print job can be altered for each handling user who has agreed to the handling of the execution of the private print, it is possible to improve user-friendliness for the handling user who uses the multifunction peripheral 100 with the print restriction.

For example, in a case in which the handling user, who is under a print restriction of the number of prints allowed for a current month being only 10, has agreed to the handling of the execution of the private print with the number of sheets to be printed of 20 in the print conditions of the job data, this handling user is not able to appropriately execute the private print without changing the print conditions, even though this handling user has agreed to the handling of the execution of the private print. In such a case, if the handling user who has agreed to the handling of the execution of the private print can freely alter the print conditions, for example, it is possible to appropriately execute the private print by changing the aggregation condition from "NORMAL" to "2-in-1". Likewise, it is possible to change the number of sheets to be printed in the print conditions from "20" to "10", for example.

Furthermore, for example, the multifunction peripheral may charge the user for the print conditions depending on the type of the multifunction peripheral. Examples include 10 JPY for black and white printing and 20 JPY for color printing. In such a case, if the handling user who has agreed to the handling of the execution of the private print can freely alter the print condition, it is possible to reduce the economic burden of the handling user by changing from "color" to "black and white" in the print conditions of the private print.

It should be noted that, while the communication (transmission and reception) between the first terminal device 120C1, the second terminal device 120C2, and the multifunction peripheral 100 is carried out with the predetermined identification information (e.g., such as the user ID, the image name "minute", and the print conditions) instead of the job data once transmitted to the multifunction peripheral 100 according to the first embodiment and the second embodiment of the present invention, it is possible to provide the advantageous effect of the present invention even when the communication (transmission and reception) is carried out with the job data itself, instead of the identification information.

Furthermore, the present invention can be provided as an image forming system in which a plurality of terminal devices and an image forming apparatus are connected via a network. Specifically, the image forming system is provided with the plurality of terminal devices and the image forming apparatus connected via the network, and the image forming apparatus includes: the list transmission means that transmits the handling user list for allowing the first terminal device to select the handling user to handle the execution of the private print, to the first terminal device when there is a print request accompanied by the private print instruction from the first terminal device; the inquiry means that inquires, when the specified handling user is selected by the first terminal device, to the second terminal device that the selected handling user uses as to whether or not to agree to the handling of the execution of the private print; and the job recording means that records, when the handling of the execution of the private print is agreed to by the second terminal device, the identification information for identifying the handling user who uses the second terminal device and the job data of the print request in association with each other. Furthermore, in the image forming system, the first terminal device includes: the request means 506 that transmits the print request accompanied by the private print instruction to the image forming apparatus; and the selection means 520 that prompts the user, when the handling user list is received from the image forming apparatus, to select the specified handling user from among the handling users included in the handling user list. Moreover, in the image forming system, the second terminal device includes: the response means that prompts the user, when the inquiry as to whether or not to agree to the handling of the execution of the private print is received from the image forming apparatus, to make a response of agreeing or refusing to the handling of the execution of the private print. The same advantageous effect can also be achieved with this configuration.

Furthermore, according to the first embodiment of the present invention, the tables respectively recorded in the use permission recording means and the authenticate information record means are identical. However, it is possible to employ a configuration using tables having different passwords, for example, and when the user logs in a terminal device, the user is allowed to input a user ID and a password corresponding to the use permission table of this terminal device, and when the user executes a private print job of the multifunction peripheral, the user is allowed to input a user ID and a password corresponding to the authentication information table of the private print job.

In addition, according to the first embodiment and the second embodiment of the present invention, the multifunction peripheral and the terminal device are configured to include the each corresponding means. However, it is possible to employ a configuration in which programs that realize each corresponding means are recorded in a recording medium, and this recording medium is provided. According to this configuration, the program is read by the multifunction peripheral or the terminal device, and the multifunction peripheral or the terminal device realizes each corresponding means. In this case, the program read from the recording medium itself provides the advantageous effect of the present invention. Furthermore, it is possible to provide a method of recoding the steps executed by each corresponding means in a hard disk.

What is claimed is:

1. An image forming apparatus that is connected via a communication network with a first terminal device to which a predetermined user is logging in and at least one second terminal device to which a handling user is logging in, the image forming apparatus comprising:

a list transmitting unit that transmits a handling user list to the first terminal device when a print request accompanied by a private print instruction and transmitted from the first terminal device is accepted, the handling user list being provided for selecting a handling user to handle execution of the private print;

an inquiring unit that inquires, when notification transmitted from the first terminal device and indicating that a specified handling user is selected from among handling users included in the handling user list is accepted, to a second terminal device to which the selected specified handling user is logged in, as to whether or not to agree to the handling of the execution of the private print; and a job recording unit that records, when notification transmitted from the second terminal device and indicating that the handling of the execution of the private print is agreed to is accepted, identification information for identifying the specified handling user logged in the second terminal device thus agreeing and job data that corresponds to the print request accompanied by the private print instruction in association with each other.

2. The image forming apparatus according to claim 1, wherein when a print request accompanied by a private print instruction is accepted, the list transmitting unit searches for a handling user logged in the second terminal device connected to the image forming apparatus via the communication network, and creates the handling user list based on a result of the search.

3. The image forming apparatus according to claim 1, wherein when notification transmitted from the second terminal device and indicating that the handling of the execution of the private print is refused to is accepted, the inquiring unit instructs the list transmitting unit to transmit a handling user list excluding the handling user using the second terminal device thus refusing to the first terminal device.

4. The image forming apparatus according to claim 1, wherein
when notification transmitted from the second terminal device and indicating that the handling of the execution of the private print is agreed to is accepted, the inquiring unit inquires, to the agreeing second terminal device as to whether or not to change an output condition corresponding to the job data of the print request, and
when notification transmitted from the second terminal device and indicating that the output condition has been altered is accepted, the job recording unit records the identification information for identifying the handling user logged in the second terminal device thus agreeing and job data that corresponds to the output condition thus altered in association with each other.

5. A method of private printing that utilizes an image forming apparatus that is connected via a communication network with a first terminal device to which a predetermined user is logged in and at least one second terminal devices to which a handling user is logged in, the method comprising:
a list transmitting step of the image forming apparatus transmitting a handling user list to the first terminal device when a print request accompanied by a private print instruction and transmitted from the first terminal device is accepted, the handling user list being provided for selecting a handling user to handle execution of the private print;
an inquiring step of the image forming apparatus inquiring, when notification transmitted from the first terminal device and indicating that a specified handling user is selected from among handling users included in the handling user list is accepted, to a second terminal device to which the selected specified handling user is logged in, as to whether or not to agree to the handling of the execution of the private print; and
a job recording step of the image forming apparatus recording, when notification transmitted from the second terminal device and indicating that the handling of the execution of the private print is agreed to is accepted, identification information for identifying the specified handling user logged in the second terminal device thus agreeing and job data that corresponds to the print request accompanied by the private print instruction in association with each other.

6. An image forming system comprising:
a first terminal device to which a predetermined user is logged in;
at least one second terminal device to which a handling user is logged in; and
an image forming apparatus that is connected to the first terminal device and the at least one second terminal device via a communication network, wherein
the image forming apparatus includes:
a list transmitting unit that transmits a handling user list to the first terminal device when a print request accompanied by a private print instruction and transmitted from the first terminal device is accepted, the handling user list being provided for selecting a handling user to handle execution of the private print;
an inquiring unit that inquires, when notification transmitted from the first terminal device and indicating that a specified handling user is selected from among handling users included in the handling user list is accepted, to a second terminal device to which the selected specified handling user is logged in, as to whether or not to agree to the handling of the execution of the private print; and
a job recording unit that records, when notification transmitted from the second terminal device and indicating that the handling of the execution of the private print is agreed to is accepted, identification information for identifying the specified handling user logged in the second terminal device thus agreeing and job data that corresponds to the print request accompanied by the private print instruction in association with each other,
the first terminal device includes:
a requesting unit that transmits the print request accompanied by the private print instruction to the image forming apparatus; and
a selecting unit that prompts the predetermined user, when the handling user list transmitted from the image forming apparatus is received, to select a specified handling user from among the handling users included in the handling user list, and
each of the at least one second terminal device includes:
a responding unit that prompts the handling user, when having received an inquiry as to whether or not to agree to the handling of the execution of the private print transmitted from the image forming apparatus is received, to make a response of agreeing or refusing to the handling of the execution of the private print.

* * * * *